(12) United States Patent
Gao et al.

(10) Patent No.: US 12,508,784 B2
(45) Date of Patent: Dec. 30, 2025

(54) THERMOPLASTIC COMPOSITE MATERIAL, PREPARATION METHOD THEREFOR AND USE THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Dali Gao, Beijing (CN); Changjin Li, Beijing (CN); Shijun Zhang, Beijing (CN); Kai Xu, Beijing (CN); Peng Kang, Beijing (CN); Qi Zhang, Beijing (CN); Hua Yin, Beijing (CN); Mingfu Lv, Beijing (CN); Dehui Kong, Beijing (CN); Qi Xin, Beijing (CN); Tao Cai, Beijing (CN); Mu Dong, Beijing (CN); Jingbo Shao, Beijing (CN); Hongwei Shi, Beijing (CN); Changhui Sun, Beijing (CN); Yiqing Bai, Beijing (CN); Yigang Tan, Beijing (CN); Guang Li, Beijing (CN); Xiaoyong Gao, Beijing (CN); Jinqi He, Beijing (CN); Meijie Li, Beijing (CN); Meng Xu, Beijing (CN); Baige Chou, Beijing (CN); Yun Lv, Beijing (CN); Yueming Ren, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 0 days.

(21) Appl. No.: 18/250,234

(22) PCT Filed: Oct. 30, 2021

(86) PCT No.: PCT/CN2021/127770
§ 371 (c)(1),
(2) Date: Apr. 24, 2023

(87) PCT Pub. No.: WO2022/089623
PCT Pub. Date: May 5, 2022

(65) Prior Publication Data
US 2023/0415430 A1     Dec. 28, 2023

(30) Foreign Application Priority Data

Oct. 30, 2020  (CN) .......................... 202011191450.5
Oct. 30, 2020  (CN) .......................... 202011192228.7
(Continued)

(51) Int. Cl.
*B29C 70/46*     (2006.01)
*B29C 70/16*     (2006.01)
(Continued)

(52) U.S. Cl.
CPC ............ *B29C 70/465* (2013.01); *B29C 70/16* (2013.01); *D02G 3/36* (2013.01); *B29K 2101/12* (2013.01); *B29K 2105/0872* (2013.01)

(58) Field of Classification Search
CPC ......... B29B 15/122; B29B 9/14; B29C 70/16; B29C 70/465; B29C 70/52; B29C 70/524;
(Continued)

(56) References Cited

U.S. PATENT DOCUMENTS

| 2,877,501 | A | * | 3/1959 | Bradt | ...................... | B29C 70/14 264/261 |
| 3,635,879 | A | * | 1/1972 | Baer et al. | ................. | C08F 2/44 428/401 |

(Continued)

FOREIGN PATENT DOCUMENTS

| CN | 1187157 A | 7/1998 |
| CN | 1252032 A | 5/2000 |

(Continued)

OTHER PUBLICATIONS

Yu, Zhong-Zhen et al., "Toughening of nylon 6 with a maleated core-shell impact modifier", Journal of Polymer Science Part B: Polymer Physics, Dec. 7, 1998, vol. 36, No. 11, pp. 1987-1994.
(Continued)

*Primary Examiner* — Shaun R Hurley
(74) *Attorney, Agent, or Firm* — NKL Law; Allen Xue

(57) ABSTRACT

A thermoplastic composite material has an inner layer material and at least one layer of outer layer material. The inner layer material is a core layer that contains fiber
(Continued)

bundles, a first thermoplastic resin and a first auxiliary agent; and the at least one layer of outer layer material wraps the core layer and is a resin layer comprising a second thermoplastic resin and an optional second auxiliary agent. The fiber bundles extend continuously from one end of the core layer to the opposite end thereof. The inner layer-outer layer composite structure improves the processing performance of the thermoplastic composite material and the lubricity between fibers and resin matrixes during injection molding, and improves the fluidity of the fibers in a resin matrix melt.

24 Claims, 4 Drawing Sheets

(30) Foreign Application Priority Data

Oct. 30, 2020 (CN) .......................... 202011193483.3
Oct. 30, 2020 (CN) .......................... 202011199839.4

(51) Int. Cl.
*D02G 3/36* (2006.01)
*B29K 101/12* (2006.01)
*B29K 105/08* (2006.01)

(58) Field of Classification Search
CPC ........ D07B 1/162; D07B 1/165; D07B 7/145; D02G 3/36; D02G 3/40; D02G 3/404
See application file for complete search history.

(56) References Cited

U.S. PATENT DOCUMENTS

| | | | |
|---|---|---|---|
| 4,312,917 A | 1/1982 | Hawley | |
| 5,783,013 A * | 7/1998 | Beckman | B29C 70/523 |
| | | | 156/433 |
| 6,090,319 A * | 7/2000 | Sharma | B29B 9/14 |
| | | | 264/108 |
| 2007/0012399 A1 | 1/2007 | Rekret | |
| 2020/0215770 A1* | 7/2020 | Gu | B29C 70/521 |

FOREIGN PATENT DOCUMENTS

| | | | |
|---|---|---|---|
| CN | 101152767 A | 4/2008 | |
| CN | 101695873 A | 4/2010 | |
| CN | 102218829 A | 10/2011 | |
| CN | 102328443 A | 1/2012 | |
| CN | 102367003 A | 3/2012 | |
| CN | 202242003 U | 5/2012 | |
| CN | 103603190 A | 2/2014 | |
| CN | 203665748 U | 6/2014 | |
| CN | 204054406 U | 12/2014 | |
| CN | 105014994 A | 11/2015 | |
| CN | 105381900 A | 3/2016 | |
| CN | 207088268 U | 3/2018 | |
| CN | 108000904 A | 5/2018 | |
| CN | 109016565 A | 12/2018 | |
| CN | 109176962 A | 1/2019 | |
| CN | 109514889 A | 3/2019 | |
| CN | 210148766 U | 3/2020 | |
| EP | 3495422 A1 | 6/2019 | |
| JP | H03272830 A | 12/1991 | |
| JP | H0762246 A | 3/1995 | |
| JP | H0770906 A | 3/1995 | |
| JP | 3235833 B2 * | 12/2001 | |
| JP | 2003033846 A | 2/2003 | |
| JP | 2008296494 A | 12/2008 | |
| WO | 2004080698 A1 | 9/2004 | |
| WO | WO-2018228972 A1 * | 12/2018 | ............. B29C 70/52 |

OTHER PUBLICATIONS

"Polypropylene BHC5003 High Impact Polypropylene Copolymer", Borealis A/S Datasheet, Jan. 1, 2004, pp. 1-3.

* cited by examiner

THERMOPLASTIC COMPOSITE MATERIAL, PREPARATION METHOD THEREFOR AND USE THEREOF

CROSS-REFERENCE TO RELATED APPLICATIONS

This application is a national entry of International Application No. PCT/CN2021/127770 filed on Oct. 30, 2021, which claims the benefit of priority to the following patent applications filed on Oct. 30, 2020:
1. Chinese patent application with the application No. CN 202011192228.7, entitled "Thermoplastic Composite Material, Preparation Method Therefor and Use Thereof";
2. Chinese patent application with the application No. CN 202011193483.3, entitled "Impregnation Mold, Impregnation Method, and Manufacturing System Comprising Impregnation Mold";
3. Chinese patent application with the application No. CN 202011191450.5, entitled "Impregnation Mold, Impregnation Method, and Manufacturing System Comprising Impregnation Mold"; and
4. Chinese patent application with the application No. CN 202011199839.4, entitled "Impregnation Mold, Impregnation Method, and Manufacturing System Comprising Impregnation Mold";
the content of which is incorporated herein by reference to the extent consistent with the present invention.

FIELD OF THE INVENTION

The present invention relates to the field of polymer composite materials, and in particular, to a thermoplastic composite material, a preparation method therefor and a use thereof.

BACKGROUND OF THE INVENTION

A long fiber reinforced thermoplastic composite material is a common thermoplastic composite material, and is one of materials with fastest development in the current composite material market. As a semi-structural material and a structural material, the development objective of the long fiber reinforced thermoplastic composite material is to be used in various industrial and civilian fields, including automobile, equipment, entertainment, food processing, communications, electronic appliance, power tool, horticulture, etc.

The long fiber reinforced thermoplastic material has a fiber length that is equal to a particle length and highly consistent fiber orientations, and has properties such as low density, ease of molding, high specific strength, high modulus, good fatigue resistance, and being nonabsorbent. Besides, this material has advantages such as good dimensional stability, excellent impact resistance, chemical stability (salt tolerance, oil resistance, fuel resistance, etc), and being recyclable, and is in particular suitable for use in an occasion where a high temperature and a low temperature alternately change frequently. The material may be formed by injection molding on an ordinary injection molding machine, may also be formed by compression molding, and is an ideal candidate for a metal alternative material. In the total usage amount of the long fiber reinforced thermoplastic composite material, the application amount of the automobile material reaches up to 80%-90%.

However, with the gradual improvement of technological levels of the long fiber reinforced thermoplastic composite material and the continuous expansion of application cases, as well as further improvements of people's awareness on health, safety and environmental protection and constant advancements of the motorization process, more and higher requirements in terms of the material performance are put forward. It is required that the material should have excellent mechanical performance, functionalization, etc, and in addition the processing performance and performance requirements of formed parts should also be taken into consideration. For example, for large-size complicated parts of automobiles and high precision electronic and electrical components, it is required that the preparation material should have high fluidity, ease of molding, high dimensional stability, high surface quality and manufacturing and forming requirements.

With respect to the above problem, existing technologies still cannot meet demands of actual application.

SUMMARY OF THE INVENTION

With respect to the above problem in existing technologies, the present invention provides a thermoplastic composite material, a preparation method therefor and a use thereof. The thermoplastic composite material in the present invention is designed based on a multi-component material system, and can achieve an effect of performance synergism among respective components. Further, the thermoplastic composite material in the present invention can also greatly improve the fluidity of fibers in a resin melt, thereby greatly improving the surface quality of the composite material and expanding the application range.

A first aspect of the present invention provides a thermoplastic composite material, which comprises an inner layer material and at least one layer of outer layer material. The inner layer material is a core layer comprising fiber bundles, a first thermoplastic resin and a first auxiliary agent; and the at least one layer of outer layer material wraps the core layer and is a resin layer comprising a second thermoplastic resin and an optional second auxiliary agent. The fiber bundles extend continuously from one end of the core layer to the opposite end thereof.

In the present invention, "one end" and/or "opposite end" are/is used with respect to a longitudinal direction of the thermoplastic composite material.

The inventor of the present application has the following finding: a first component comprising a first thermoplastic resin and a first auxiliary agent is used to impregnate continuous fiber bundles so as to form a core layer, and an outside of the core layer is uniformly wrapped by a second component comprising a second thermoplastic resin and an optional second auxiliary agent, so that a thermoplastic composite material, which uses a continuous fiber enforced resin as a core layer (inner layer material) of and uses a resin layer wrapping the outside of the core layer as an outer layer material, is formed. By adjusting the performances and functions of the first thermoplastic resin in the core layer and the second thermoplastic resin in the resin layer, the thermoplastic composite material can have different performances and functions.

According to some embodiments of the thermoplastic composite material in the present invention, the outer layer material (the resin layer) can substantively continuously wrap the inner layer material (the core layer). Although it is not preferable, in the thermoplastic composite material in the present invention, the outer layer material (the resin layer) wraps at least 80% of the inner layer material (the core layer). For example, the outer layer material wraps at least 80%-99% or 85%-95% of the inner layer material (the core layer).

According to some embodiments of the thermoplastic composite material in the present invention, the thermoplastic composite material may be in the shape of strips, rods or granules. It is certain that the thermoplastic composite material in the present invention may also be in other shapes, such as continuous filamentous. In the present application, the thermoplastic composite material in the shape of strips, rods or granules may be formed by cutting the thermoplastic composite material in the shape of continuous filamentous.

In some embodiments, the thermoplastic composite material is in the shape of strips, rods or granules. the length (longitudinal dimension) of the thermoplastic composite material in the shape of strips, rods or granules is 5-30 mm, preferably 5-25 mm, and more preferably 6-15 mm.

In other embodiments, although it is not preferable, the thermoplastic composite material may also have a relatively smaller length dimension. For example, the thermoplastic composite material is in the shape of granules, and a particle diameter (length) of the thermoplastic composite material in the shape of granules may also be 2-5 mm, preferably 3-4 mm.

According to some embodiments of the thermoplastic composite material in the present invention, the present invention has no specific requirements for a shape of a cross section of the thermoplastic composite material. In some embodiments, the cross section of the thermoplastic composite material in the shape of rods or granules may be circular or quasi-circular. In other embodiments, the cross section of the thermoplastic composite material in the shape of rods or granules may be rectangular or square.

According to some embodiments of the thermoplastic composite material in the present invention, in the inner layer material, an amount of the first thermoplastic resin may be 1-90 parts by weight, and an amount of the fiber bundles may be 10-110 parts by weight.

In some specific embodiments, in the inner layer material, the amount of the first thermoplastic resin may be 1 part by weight, 10 parts by weight, 20 parts by weight, 25 parts by weight, 30 parts by weight, 40 parts by weight, 45 parts by weight, 50 parts by weight, 55 parts by weight, 60 parts by weight, 70 parts by weight, 80 parts by weight, 90 parts by weight, or in a range formed by these values; and in some specific embodiments, the amount of the fiber bundles may be 1 part by weight, 10 parts by weight, 20 parts by weight, 25 parts by weight, 30 parts by weight, 40 parts by weight, 50 parts by weight, 60 parts by weight, 70 parts by weight, parts by weight, 90 parts by weight, 100 parts by weight, 110 parts by weight, or in a range formed by these values.

In some preferred embodiments, in the inner layer material, the amount of the first thermoplastic resin may be 20-70 parts by weight, preferably 20-55 parts by weight, and more preferably 24-45 parts by weight; and/or the amount of the fiber bundles may be 20-110 parts by weight, preferably 25-110 parts by weight.

According to some embodiments of the thermoplastic composite material in the present invention, in the outer layer material, an amount of the second thermoplastic resin may be 1-110 parts by weight.

In some specific embodiments, in the outer layer material, the amount of the second thermoplastic resin may be 1 part by weight, 10 parts by weight, 20 parts by weight, 30 parts by weight, 40 parts by weight, 45 parts by weight, 50 parts by weight, 60 parts by weight, 65 parts by weight, 70 parts by weight, 75 parts by weight, 80 parts by weight, 85 parts by weight, 90 parts by weight, 95 parts by weight, 100 parts by weight, 105 parts by weight, 110 parts by weight, or in a range formed by these values.

In some preferred embodiments, in the outer layer material, the amount of the second thermoplastic resin may be 10-99 parts by weight, preferably 10-90 parts by weight, and more preferably 40-90 parts by weight.

According to some specific embodiments of the thermoplastic composite material in the present invention, in the inner layer material, the amount of the first thermoplastic resin may be 1-90 parts by weight, preferably 20-70 parts by weight, more preferably 20-55 parts by weight, and further preferably 24-45 parts by weight; and/or the amount of the fiber bundles may be parts by weight, preferably 20-80 parts by weight, and more preferably 25-50 parts by weight.

According to other specific embodiments of the thermoplastic composite material in the present invention, in the inner layer material, the amount of the first thermoplastic resin may be parts by weight, further preferably 50-60 parts by weight; and/or the amount of the fiber bundles may be 90-110 parts by weight, preferably 100-110 parts by weight; and/or in the outer layer material, the amount of the second thermoplastic resin may be 90-110 parts by weight, preferably 95-105 parts by weight.

According to some embodiments of the thermoplastic composite material in the present invention, in the inner layer material, a weight ratio of the fiber bundles to the first thermoplastic resin may be 0.25-6:1. For example, in the inner layer material, the weight ratio of the fiber bundles to the first thermoplastic resin may be 0.25:1, 0.3:1, 0.35:1, 0.4:1, 0.45:1, 0.5:1, 0.55:1, 0.65:1, 0.7:1, 0.8:1, 0.9:1, 1:1, 1.2:1, 1.5:1, 1.7:1, 1.8:1, 1.9:1, 2:1, 2.5:1, 3:1, 3.5:1, 4:1, 4.5:1, 5:1, 6:1, or in a range formed by these values.

In some preferred embodiments, in the inner layer material, the weight ratio of the fiber bundles to the first thermoplastic resin may be 0.35-4.5:1, preferably 0.43-4.5:1.

The present invention does not limit the amounts of the first auxiliary agent and the second auxiliary agent, so as to achieve a function of a relevant auxiliary agent.

In different embodiments of the present invention, the number of layers of the outer layer material is not limited. There may be one layer or multiple layers in the outer layer material. When there are multiple layers in the outer layer material, the multiple layers of the outer layer material may be formed by one type of outer layer material, and may also be formed by various types of outer layer material.

According to some embodiments of the thermoplastic composite material in the present invention, the first thermoplastic resin and the second thermoplastic resin may be the same or different, and each are independently selected from at least one of a group consisting of polypropylene, polyethylene, polystyrene, polyvinyl chloride, polyacrylonitrile-butadiene-styrene copolymer, polyacrylonitrile-styrene copolymer, polyformaldehyde, polyamide, polyethylene terephthalate, polybutylene terephthalate, polymethyl methacrylate, polycarbonate, polyphenyl ether, polyurethane, polyether ether ketone, polyphenylene sulfide, and alloy polymers thereof.

According to preferred embodiments of the thermoplastic composite material in the present invention, the first thermoplastic resin and the second thermoplastic resin each are independently selected from at least one of a group consisting of polypropylene, polyethylene, polyamide (also referred to as nylon), polyethylene terephthalate (PET), polybutylene terephthalate (PBT), polyphenylene sulfide, polyurethane, and polyether ether ketone (PEEK).

According to preferred embodiments of the thermoplastic composite material in the present invention, the first thermoplastic resin and the second thermoplastic resin each are independently selected from at least one of a group consisting of homo-polypropylene, co-polypropylene, a mixture of homo-polypropylene and co-polypropylene, nylon 6 (PA6), nylon 66 (PA66), and a mixture of nylon 6 and nylon 66.

According to other embodiments of the thermoplastic composite material in the present invention, the first thermoplastic resin and the second thermoplastic resin may also be selected from a group consisting of a thermoplastic polyurethane elastomer (TPU) and/or high temperature nylon (PPA).

According to some embodiments of the thermoplastic composite material in the present invention, a melt flow rate of the first thermoplastic resin under conditions of 230° C. and 2.16 kg load is 60-8000 g/10 min. For example, the melt flow rate of the first thermoplastic resin under conditions of 230° C. and 2.16 kg load may be 60 g/10 min, 100 g/10 min, 200 g/10 min, 450 g/10 min, 500 g/10 min, 1000 g/10 min, 1500 g/10 min, 2000 g/10 min, 3000 g/10 min, 4000 g/10 min, 5000 g/10 min, 6000 g/10 min, 7000 g/10 min, 7500 g/10 min, 8000 g/10 min, or in a range formed by these values.

In some preferred embodiments, the melt flow rate of the first thermoplastic resin under conditions of 230° C. and 2.16 kg load may be 100-8000 g/10 min, preferably 1000-7500 g/10 min, and more preferably 1900-7500 g/10 min.

According to some embodiments of the thermoplastic composite material in the present invention, a melt flow rate of the second thermoplastic resin under conditions of 230° C. and 2.16 kg load is 0.1-8000 g/10 min. For example, the melt flow rate of the second thermoplastic resin under conditions of 230° C. and 2.16 kg load may be 0.1 g/10 min, 1 g/10 min, 1.5 g/10 min, 3 g/10 min, 10 g/10 min, 20 g/10 min, 30 g/10 min, 40 g/10 min, 45 g/10 min, 50 g/10 min, 55 g/10 min, 60 g/10 min, 70 g/10 min, 80 g/10 min, 90 g/10 min, 100 g/10 min, 450 g/10 min, 500 g/10 min, 800 g/10 min, 1000 g/10 min, 1500 g/10 min, 1900 g/10 min, 2500 g/10 min, 3000 g/10 min, 4000 g/10 min, 5000 g/10 min, 6000 g/10 min, 7000 g/10 min, 8000 g/10 min, or in a range formed by these values.

In some preferred embodiments, the melt flow rate of the second thermoplastic resin under conditions of 230° C. and 2.16 kg load may be 3-55 g/10 min or 450-8000 g/10 min, preferably 3-45 g/10 min or 1900-8000 g/10 min.

In different embodiments of the present invention, the melt flow rate of the first thermoplastic resin and the melt flow rate of the second thermoplastic resin are not limited specifically, and the melt flow rate of the first thermoplastic resin and the melt flow rate of the second thermoplastic resin may be selected according a desired performance.

In particular, the inventor of the present application has found that a thermoplastic composite material which has both a high surface quality performance and a comprehensive performance can be prepared according to the parameters (for example, the melt flow rate) of the present invention. For example, when the melt flow rate of the first thermoplastic resin is greater than the melt flow rate of the second thermoplastic resin, the thermoplastic composite material may have an improved mechanical property; and on the contrary, when the melt flow rate of the second thermoplastic resin is greater than the melt flow rate of the first thermoplastic resin, the thermoplastic composite material may have an improved glossiness.

According to some preferred embodiments of the thermoplastic composite material in the present invention, the melt flow rate of the first thermoplastic resin under conditions of 230° C. and 2.16 kg load is 60-450 g/10 min, for example, 60-200 g/10 min; and the melt flow rate of the second thermoplastic resin under conditions of 230° C. and 2.16 kg load is 3-55 g/10 min or 450-8000 g/10 min. In some specific embodiments, the melt flow rate of the first thermoplastic resin under conditions of 230° C. and 2.16 kg load is 60-450 g/10 min, and the melt flow rate of the second thermoplastic resin under conditions of 230° C. and 2.16 kg load is 800-8000 g/10 min.

According to other preferred embodiments of the thermoplastic composite material in the present invention, the melt flow rate of the first thermoplastic resin under conditions of 230° C. and 2.16 kg load is equal to or greater than 450 g/10 min, in particular greater than 450 g/10 min, and the melt flow rate of the second thermoplastic resin under conditions of 230° C. and 2.16 kg load is less than 100 g/10 min, preferably 1.5-55 g/10 min, and more preferably 3-50 g/10 min.

According to some embodiments of the thermoplastic composite material in the present invention, a weight ratio of the second thermoplastic resin to the first thermoplastic resin is 0.05-12.5:1. For example, the weight ratio of the second thermoplastic resin to the first thermoplastic resin may be 0.05:1, 0.1:1, 0.14:1, 0.15:1, 0.18:1, 0.2:1, 0.25:1, 0.3:1, 0.5:1, 0.8:1, 1:1, 1.2:1, 1.3:1, 1.4:1, 1.7:1, 2:1, 2.5:1, 3:1, 3.5:1, 4:1, 5:1, 8:1, 10:1, 12.5:1, or in a range formed by these values.

In some preferred embodiments, the weight ratio of the second thermoplastic resin to the first thermoplastic resin may be 0.1-4:1, preferably 0.14-3.5:1.

According to preferred embodiments of the thermoplastic composite material in the present invention, when the melt flow rate of the second thermoplastic resin under conditions of 230° C. and 2.16 kg load is 800-8000 g/10 min, the weight ratio of the second thermoplastic resin to the first thermoplastic resin is less than 0.25:1, preferably less than 0.18:1, and more preferably less than 0.15:1.

According to some embodiments of the thermoplastic composite material in the present invention, when the first thermoplastic resin and the second thermoplastic resin are selected from at least one of a group consisting of nylon 6, nylon 66, and a mixture of nylon 6 and nylon 66, a viscosity of the selected nylon 6 and nylon 66 is 1.8-3.5. Wherein, the viscosity of nylon in the present invention is a relative viscosity measured according to determination of Engler viscosity GB/T266-88.

According to specific embodiments of the thermoplastic composite material in the present invention, the first thermoplastic resin and the second thermoplastic resin may be home-made, and may also be commercially available.

For example, a polypropylene resin commercially available from Sinopec Yangzi Petrochemical Co. Ltd. with a designation of PPB-M100-GH, a polypropylene resin commercially available from Sinopec East China Oil & Gas Company with a designation of M60RHC, and nylon 6 commercially available from Sinopec Baling Petrochemical Company with a designation of PA6-BL3200H may be used as the first thermoplastic resin.

For example, a polypropylene resin commercially available from Sinopec Yangzi Petrochemical Co. Ltd. with a designation of PPB-M100-GH, a polypropylene resin commercially available from Sinopec Maoming Petrochemical Company with a designation of PPH-T03, a polypropylene resin commercially available from Sinopec East China Oil & Gas Company with a designation of M50RH, a polypropylene resin commercially available from Sinopec Yanshan Petrochemical Company with a designation of K8303, a polypropylene resin commercially available from Hunan Shengjin New Material Co. Ltd. with a designation of PF1500, or a polypropylene resin commercially available from Sinopec Shijiazhuang Refining & Chemical Company with a designation of PPH-Y450, and nylon 6 commercially available from Sinopec Baling Petrochemical Company with a designation of PA6-BL3200H may be used as the second thermoplastic resin.

According to some embodiments of the thermoplastic composite material in the present invention, the fiber bundles are selected from at least one of a group consisting of glass fiber, carbon fiber, basalt fiber, aromatic polyamide fiber, stainless steel fiber, synthetic resin fiber, and mineral fiber.

According to preferred embodiments of the thermoplastic composite material in the present invention, the glass fiber is a continuous glass fiber and/or a fixed length glass fiber.

The fiber bundles suitable for use in the present invention may be an alkali-free glass fiber commercially available from Owens Corning (Shanghai) Glass Fiber Co. Ltd. with a designation of SE4805, an alkali-free glass fiber commercially available from Chongqing Polycomp International Corporation with a designation of ER4301H, a carbon fiber commercially available from Toray Company of Japan with a designation of T700SC, and a basalt fiber commercially available from Mudanjiang Jinshi Basalt Fiber Co. Ltd. with a designation of T700SC.

According to some embodiments of the thermoplastic composite material in the present invention, on a cross section of the thermoplastic composite material, the core layer and the resin layer are provided in sequence from inside to outside; and the fiber bundles are orientated in the longitudinal direction of the thermoplastic composite material. Preferably, in the present invention, a length of the fiber bundles is essentially the same as a length of the thermoplastic composite material (longitudinal dimension), and thus the fiber bundles extend from one end of the core layer in the longitudinal direction to the opposite end of the core layer in the longitudinal direction.

In some preferred embodiments, the fiber bundles may be subjected to a dispersing processing. Such a dispersing processing method is known in the art, and the present invention has no particular limitation on the dispersing processing method.

According to some embodiments of the thermoplastic composite material in the present invention, the inner layer material does not contain short fibers, and in particular does not contain non-orientated short fibers.

In some specific embodiments, the inner layer material is formed by the fiber bundles, the first thermoplastic resin, and the first auxiliary agent.

According to some embodiments of the thermoplastic composite material in the present invention, the outer layer material does not contain fibers. In some preferred embodiments, the outer layer material is formed by the second thermoplastic resin, or by the second thermoplastic resin and the second auxiliary agent.

According to other embodiments of the thermoplastic composite material in the present invention, the outer layer material contains fibers, such as short fibers.

In some specific embodiments, in the outer layer material, a weight ratio of the fibers to the second thermoplastic resin are 1-50:100, preferably 5-50:100, and more preferably 20-45:100.

According to some embodiments of the thermoplastic composite material in the present invention, when the first thermoplastic resin and the second thermoplastic resin respectively having a mass of 100 parts by weight, the first auxiliary agent and the second auxiliary agent each independently include at least one of 0.5-15 parts by weight of a compatilizer, 0.05-3 parts by weight of an antioxidant, and 0.05-2.5 parts by weight of a lubricant. Preferably, the first auxiliary agent and the second auxiliary agent each include at least one of 1-15 parts by weight, preferably 1-6 parts by weight, and more preferably 3-6 parts by weight of the compatilizer, parts by weight, preferably 0.1-0.5 parts by weight of the antioxidant, and 0.5-2.5 parts by weight of the lubricant.

According to some embodiments of the thermoplastic composite material in the present invention, the compatilizer is selected from at least one of graft modified polymers of a polar monomer. Preferably, the polar monomer is selected from at least one of a group consisting of maleic anhydride, maleic anhydride derivative, propenoic acid, and acrylate derivative. Preferably, the polymer is selected from at least one of a group consisting of polyethylene, polypropylene, ethylene-α-olefin copolymer, and propylene-α-olefin (the α-olefin other than propylene) copolymer.

According to specific embodiments of the thermoplastic composite material in the present invention, maleic anhydride grafted polypropylene (PP-g-MAH) commercially available from Polyram Plastics Industry Co. Ltd. with a designation of BONDYRAM 1001, a maleic anhydride grafted ethylene-octene copolymer (POE-g-MAH) commercially available from Shanghai Sunny Technology Co., Ltd. with a designation of CMG9805, a titanate coupling agent commercially available from Nanjing Shuguang Chemical Group with a designation of NDZ12, or an aluminate coupling agent commercially available from Nanjing Up Chemical Co., Ltd. with a designation of XHY-501 may be used as the compatilizer.

According to some embodiments of the thermoplastic composite material in the present invention, the antioxidant is selected from at least one of a group consisting of tetra [β-(3,5-di-tert-butyl-4-hydroxyphenyl) propionic acid] pentaerythritol ester (antioxidant 1010), tri [2,4-di-tert-butylphenyl] phosphite ester (antioxidant 168), octadecyl β-(3, 5-di-tert-butyl-4-hydroxyphenyl) propionate (antioxidant 1076), 2,2'-methylene bis (4-methyl-6-tert-butylphenol) (antioxidant 2246), 1,1,3-tri (2-methyl-4-hydroxyl-5-tert-butylphenyl) butane (antioxidant CA), and bis (2,4-di-tert-butylphenol) pentaerythritol diphosphite (antioxidant 626).

According to specific embodiments of the thermoplastic composite material in the present invention, antioxidant 1010 and/or antioxidant 168 commercially available from BASF Corporation may be used as the antioxidant.

According to some embodiments of the thermoplastic composite material in the present invention, the lubricant is selected from at least one of a group consisting of ethylene bis stearamide, calcium stearate, polyethylene wax, pentaerythritol stearate, silicone, polyethylene glycol and fluorine-containing resin.

According to specific embodiments of the thermoplastic composite material in the present invention, an oxidized polyethlene wax commercially available from Xianghe Paint Group with a designation of XH-201 may be used as the lubricant.

In different embodiments of the present invention, the first auxiliary agent may also include at least one of a group consisting of slip agent, antistatic agent, and plasticizer, and/or the second auxiliary agent may also include at least one of a group consisting of slip agent, antistatic agent, plasticizer, nucleating agent, light stabilizer, expansion flame retardant, heat stabilizer, color master and electrical insulation modifier, and filler. The specific type and amount of the auxiliary agents are not limited, and may have broader selection ranges.

According to specific embodiments of the thermoplastic composite material in the present invention, the expansion flame retardant may be a compounded flame retardant, which includes ammonium polyphosphate (APP), pentaerythritol (PER), melamine cyanurate (MCA), an optional nano silicone rubber, and optional organic montmorillonite (MMT).

In the present invention, ammonium polyphosphate has a degree of polymerization that is greater than 1000, and a content of $P_2O_5$ is greater than 71 wt % with a density of 1.9 g/cm³ and an average particle diameter of 15 μm.

In the present invention, pentaerythritol may be commercially available generic pentaerythritol.

In the present invention, melamine cyanurate may be commercially available generic melamine cyanurate.

In the present invention, the nano powder silicone rubber may be a fully vulcanized powder silicone rubber VP-601. Such a fully vulcanized powder silicone rubber VP-601 is described in Chinese Patent ZL01801656.1, the content of which is incorporated herein by reference to the extent consistent with the present invention.

In the present invention, organic montmorillonite has a particle diameter of 100-300 nm.

According to some specific embodiments of the thermoplastic composite material in the present invention, in the expansion flame retardant, a weight ratio of ammonium polyphosphate (APP), pentaerythritol (PER), melamine cyanurate (MCA), the nano powder silicone rubber, and organic montmorillonite (MMT) is (3-8):(1-3):(1-5):(0-0.5):(0-0.5), preferably (3-4):(1-2):(1-3):(0.05-0.3):(0.05-0.3).

Preferably, based on 100 parts by weight of the mass of the second thermoplastic resin, an amount of the expansion flame retardant is 30-50 parts by weight, preferably 30-45 parts by weight, and more preferably 32-38 parts by weight.

According to some specific embodiments of the thermoplastic composite material in the present invention, when the first thermoplastic resin and the second thermoplastic resin having a mass of 100 parts by weight, the first auxiliary agent and the second auxiliary agent each independently include 2-30 parts by weight of an electrical insulation modifier, and preferably independently include 5-25 parts by weight of the electrical insulation modifier.

According to some specific embodiments of the thermoplastic composite material in the present invention, the electrical insulation modifier may be an alkyl and/or alkoxy graft modified polypropylene material. The graft modified polypropylene material includes a structural unit derived from co-polypropylene and a structural unit derived from an acrylate monomer and an optional acrylic monomer. Based on the weight of the graft modified polypropylene material, a content of the structural unit derived from the acrylate monomer and the optional acrylic monomer and in a grafting state in the graft modified polypropylene material is 0.3-7 wt %, preferably 0.8-5 wt %.

The graft modified polypropylene material has at least one of the following features: a melt flow rate under conditions of 230° C. and 2.16 kg load is 0.01-30 g/10 min, preferably 0.05-20 g/10 min, further preferably 0.1-10 g/10 min, and more preferably 0.2-8 g/10 min.

In some specific embodiments, the acrylate monomer is selected from at least one of monomers having a structure shown in formula I:

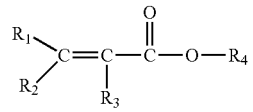

formula I

In formula I, $R_1$, $R_2$, and $R_3$ each are independently selected from at least one of a group consisting of H, $C_1$-$C_6$ linear alkyl, $C_3$-$C_6$ branched alkyl; $R_4$ is selected from the following substituted or unsubstituted groups: $C_1$-$C_{20}$ linear alkyl, $C_3$-$C_{20}$ branched alkyl, $C_3$-$C_{12}$ cycloalkyl, $C_3$-$C_{12}$ epoxide alkyl; and the substituent group is selected from at least one of a group consisting of halogen, amidogen and hydroxyl.

Preferably, the acrylate monomer is selected from at least one of a group consisting of (methyl) methyl acrylate, (methyl) sec-butyl acrylate, (methyl) ethyl acrylate, (methyl) n-butyl acrylate, (methyl) isobutyl acrylate, (methyl) tert-butyl acrylate, (methyl) iso-octyl acrylate, (methyl) dodecyl acrylate, (methyl) coconut oleate acrylate, (methyl) octadecyl acrylate, (methyl) dimethylaminoethyl acrylate, (methyl) diethylaminoethyl acrylate, (methyl) dimethylaminopropyl acrylate, and (methyl) glycidyl acrylate.

In the graft modified polypropylene material, the acrylic monomer is selected from at least one of monomers having a structure shown in formula II:

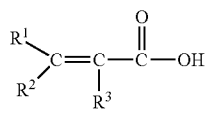

formula II

In formula II, $R_1$, $R_2$, and $R_3$ each are independently selected from a group consisting of H, $C_1$-$C_6$ linear alkyl, $C_3$-$C_6$ branched alkyl.

Preferably, the acrylic monomer is selected from at least one of a group consisting of acrylic acid, methacrylic acid, and 2-ethylacrylic acid.

In the graft modified polypropylene material, a molar ratio of the structural unit derived from the acrylate monomer to the structural unit derived from the acrylic monomer is 1:0-2, preferably 1:0.125-1.

In a specific embodiment, the polypropylene graft heterocylic ring modified material is polypropylene-g-glycidyl methacrylate. A melt flow rate of polypropylene-g-glycidyl methacrylate under conditions of 230° C. and 2.16 kg load is 2-8 g/10 min, and a content of the structural unit in the grafting state is 1-8%.

According to other embodiments of the thermoplastic composite material in the present invention, the electrical insulation modifier is an aromatic olefin graft modified polypropylene material. The aromatic olefin graft modified polypropylene material includes a structural unit derived from co-polypropylene and a structural unit derived from a styrene monomer. Based on the weight of the aromatic olefin graft modified polypropylene material, a content of a structural unit derived from the styrene monomer and in the grafting state in the aromatic olefin graft modified polypropylene material is 0.5-14 wt %, preferably 1-7.5 wt %, and more preferably 1.5-5 wt %.

A melt flow rate of the aromatic olefin graft modified polypropylene material under conditions of 230° C. and 2.16 kg load is 0.01-30 g/10 min, preferably 0.05-20 g/10 min, further preferably 0.1-10 g/10 min, and more preferably 0.2-8 g/10 min.

The styrene monomer is selected from at least one of a monomer having a structure shown in formula III, a monomer having a structure shown in formula IV, and a monomer having a structure shown in formula V

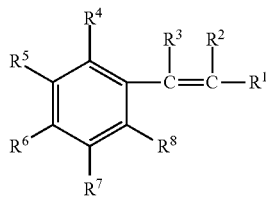

formula III

In formula III, $R^1$, $R^2$, and $R^3$ each are independently selected from a group consisting of H, substituted or unsubstituted alkyl $C_1$-$C_6$; and $R^4$-$R^8$ each are independently selected from a group consisting of H, halogen, hydroxyl, amino, phosphoric acid group, sulfonic acid group, substituted or unsubstituted $C_1$-$C_{12}$ alkyl, substituted or unsubstituted $C_3$-$C_{12}$ cycloalkyl, substituted or unsubstituted $C_1$-$C_{12}$ alkoxy, substituted or unsubstituted $C_1$-$C_{12}$ ester group, substituted or unsubstituted $C_1$-$C_{12}$ amino, and the substituent group is selected from a group consisting of halogen, hydroxyl, amino, phosphoric acid group, sulfonic acid group, $C_1$-$C_{12}$ alkyl, $C_3$-$C_{12}$ cycloalkyl, $C_1$-$C_{12}$ alkoxy, $C_1$-$C_{12}$ ester group, $C_1$-$C_{12}$ amino. Preferably, $R^1$, $R^2$, and $R^3$ each are independently selected from a group consisting of H, substituted or unsubstituted $C_1$-$C_3$ alkyl, and $R^4$-$R^8$ each are independently selected from a group consisting of H, halogen, hydroxyl, amino, substituted or unsubstituted $C_1$-$C_6$ alkyl, substituted or unsubstituted $C_1$-$C_6$ alkoxy.

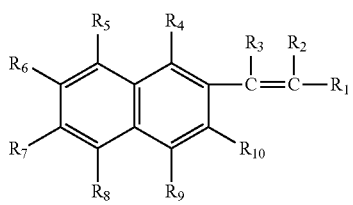

formula IV

In formula IV, $R_1$, $R_2$, and $R_3$ each are independently selected from a group consisting of H, substituted or unsubstituted $C_1$-$C_6$ alkyl; and $R_4$-$R_{10}$ each are independently selected from a group consisting of H, halogen, hydroxyl, amino, phosphoric acid group, sulfonic acid group, substituted or unsubstituted $C_1$-$C_{12}$ alkyl, substituted or unsubstituted $C_3$-$C_{12}$ cycloalkyl, substituted or unsubstituted $C_1$-$C_{12}$ alkoxy, substituted or unsubstituted $C_1$-$C_{12}$ ester group, substituted or unsubstituted $C_1$-$C_{12}$ amino, and the substituent group is selected from a group consisting of halogen, hydroxyl, amino, phosphoric acid group, sulfonic acid group, $C_1$-$C_{12}$ alkyl, $C_3$-$C_{12}$ cycloalkyl, $C_1$-$C_{12}$ alkoxy, $C_1$-$C_{12}$ ester group, $C_1$-$C_{12}$ amino. Preferably, $R_1$, $R_2$, and $R_3$ each are independently selected from a group consisting of H, substituted or unsubstituted $C_1$-$C_3$ alkyl, and $R_4$-$R_{10}$ each are independently selected from a group consisting of H, halogen, hydroxyl, amino, substituted or unsubstituted $C_1$-$C_6$ alkyl, substituted or unsubstituted $C_1$-$C_6$ alkoxy, the substituent group is selected from a group consisting of halogen, hydroxyl, amino, $C_1$-$C_6$ alkyl, and $C_1$-$C_6$ alkoxy.

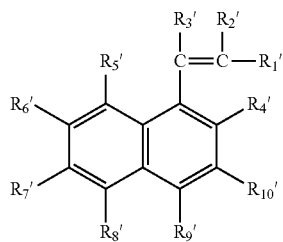

formula V

In formula V, $R_1'$, $R_2'$, and $R_3'$ each are independently selected from a group consisting of H, substituted or unsubstituted $C_1$-$C_6$ alkyl; and $R_4'$-$R_{10}'$ each are independently selected from a group consisting of H, halogen, hydroxyl, amino, phosphoric acid group, sulfonic acid group, substituted or unsubstituted $C_1$-$C_{12}$ alkyl, substituted or unsubstituted $C_3$-$C_{12}$ cycloalkyl, substituted or unsubstituted $C_1$-$C_{12}$ alkoxy, substituted or unsubstituted $C_1$-$C_{12}$ ester group, substituted or unsubstituted $C_1$-$C_{12}$ amino, and the substituent group is selected from a group consisting of halogen, hydroxyl, amino, phosphoric acid group, sulfonic acid group, $C_1$-$C_{12}$ alkyl, $C_3$-$C_{12}$ cycloalkyl, $C_1$-$C_{12}$ alkoxy, $C_1$-$C_{12}$ ester group, $C_1$-$C_{12}$ amino. Preferably, $R_1'$, $R_2'$, and $R_3'$ each are independently selected from a group consisting of H, substituted or unsubstituted $C_1$-$C_3$ alkyl, and $R_4'$-$R_{10}'$ each are independently selected from a group consisting of H, halogen, hydroxyl, amino, substituted or unsubstituted $C_1$-$C_6$ alkyl, substituted or unsubstituted $C_1$-$C_6$ alkoxy, the substituent group is selected from a group consisting of halogen, hydroxyl, amino, $C_1$-$C_6$ alkyl, $C_1$-$C_6$ alkoxy.

Preferably, the styrene monomer is selected from at least one of a group consisting of styrene, α-methylstyrene, 1-vinylnaphthalene, 2-vinylnaphthalene, mono-substituted or multi-substituted styrene, mono-substituted or multi-substituted α-methylstyrene, mono-substituted or multi-substituted 1-vinylnaphthalene and mono-substituted or multi-substituted 2-vinylnaphthalene; and the substituent group is preferably selected from at least one of a group consisting of halogen, hydroxyl, amino, phosphoric acid group, sulfonic acid group, $C_1$-$C_8$ linear alkyl, $C_3$-$C_8$ branched alkyl or cycloalkyl, $C_1$-$C_6$ linear alkoxy, $C_3$-$C_8$ branched alkoxy or cyclic alkoxy, $C_1$-$C_8$ linear ester group, $C_3$-$C_8$ linear ester group or cyclic ester group, $C_1$-$C_8$ linear amino, and $C_3$-$C_8$ branched amino or cyclic amino.

More preferably, the styrene monomer is selected from at least one of a group consisting of styrene, α-methylstyrene, 2-methyl styrene, 3-methyl styrene, and 4-methyl styrene.

In some specific embodiments, the polypropylene graft heterocyclyl ring modified material is polypropylene-g-styrene. A melt flow rate of polypropylene-g-styrene under conditions of 230° C. and 2.16 kg load is 2-8 g/10 min, and a content of the structural unit in the grafting state is 1-8%.

According to other embodiments of the thermoplastic composite material in the present invention, the electrical insulation modifier is a silane modified polypropylene graft. The graft includes a structural unit derived from co-polypropylene and a structural unit derived from a silane monomer containing alkenyl. Based on the weight of the silane modified polypropylene graft, a content of a structural unit derived from the silane monomer containing alkenyl and in the grafting state in the silane modified polypropylene graft is 0.2-6 wt %, preferably 0.2-2.5 wt %.

Co-polypropylene has the following features: a content of a co-monomer is 0.5-40 mol %, preferably 0.5-30 mol %; a content of a xylene soluble substance is 2-80 wt %; a content of the co-monomer in the soluble substance is 10-70 wt %; and an intrinsic viscosity ratio of the soluble substance to polypropylene is 0.3-5.

The silane modified polypropylene graft has at least one of the following features: a melt flow rate under conditions of 230° C. and 2.16 kg load is 0.01-30 g/10 min, preferably 0.05-20 g/10 min, further preferably 0.1-10 g/10 min, and more preferably 0.2-8 g/10 min.

In the silane modified polypropylene graft, the silane monomer containing alkenyl is selected from at least one of monomers having a structure shown in formula VI,

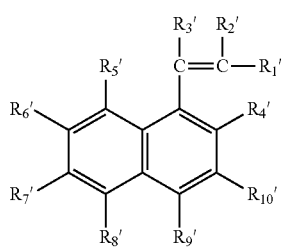

formula VI

In formula VI, $R_1$ is $C_2$-$C_{12}$ alkenyl, and preferably monounsaturated alkenyl; and $R_2$, $R_3$ and $R_4$ each are independently selected from a group consisting of substituted or unsubstituted $C_1$-$C_{12}$ linear alkyl, substituted or unsubstituted $C_3$-$C_{12}$ branched alkyl, substituted or unsubstituted $C_1$-$C_{12}$ alkoxy, substituted or unsubstituted $C_1$-$C_{12}$ acyl group; and preferably, R1 is $C_2$-$C_6$ alkenyl, preferably monounsaturated alkenyl; and $R_2$, $R_3$, $R_4$ each are independently selected from a group consisting of substituted or unsubstituted $C_1$-$C_6$ linear alkyl, substituted or unsubstituted $C_3$-$C_6$ branched alkyl, substituted or unsubstituted $C_1$-$C_6$ alkoxy, substituted or unsubstituted $C_1$-$C_6$ acyloxy group.

More preferably, the silane monomer containing alkenyl is selected from at least one of a group consisting of vinyltriethoxy silane, vinyltrimethoxy silane, vinyltriisopropyoxy silane, vinyltritert-butoxy silane, vinyltriacetoxy silane, methylvinyldimethoxy silane, ethylvinyldiethoxy silane, allyltriethoxy silane, allyltrimethoxy silane, allyltriisopropyoxy silane, vinyltriethoxy tri (β-methoxyethoxy) silane, allyl tri (β-methoxyethoxy) silane, allyltritert-butoxy silane, allyltriacetoxy silane, methylallyldimethoxy silane, and ethylallyldiethoxy silane.

According to some embodiments of the thermoplastic composite material in the present invention, the first auxiliary agent and the second auxiliary agent each independently include 2-30 parts by weight of the electrical insulation modifier, preferably 5-25 parts by weight of the electrical insulation modifier. The electrical insulation modified material is prepared according to CN202011190993.5.

According to some embodiments of the thermoplastic composite material in the present invention, the electrical insulation modifier is a polypropylene graft containing an acid anhydride group, which includes a structural unit derived from co-polypropylene, a structural unit derived from a maleic anhydride monomer, and a structural unit derived from an alkenyl-containing polymeric monomer. Based on the weight of the polypropylene graft containing an acid anhydride group, in the polypropylene graft containing an acid anhydride group, a content of the structural unit derived from the maleic anhydride monomer and the structural unit derived from the alkenyl-containing polymeric monomer and in the grafting state is 0.1-5 wt %, and preferably wt %; and a molar ratio of the structural unit derived from the maleic anhydride monomer to the structural unit derived from the alkenyl-containing polymeric monomer is 1:1-20, and preferably 1:1-10.

The polypropylene graft containing an acid anhydride group has at least one of the following features: a melt flow rate under conditions of 230° C. and 2.16 kg load is 0.01-30 g/10 min, preferably 0.05-20 g/10 min, further preferably 0.1-10 g/10 min, and more preferably 0.2-8 g/10 min.

In the polypropylene graft containing an acid anhydride group, the co-monomer of the co-polypropylene is selected from at least one of $C_2$-$C_8$ α-olefin except propylene; preferably the co-monomer of the co-polypropylene is selected from at least one of a group consisting of ethylene, 1-butene, 1-pentene, 4-methyl-1-pentene, 1-hexene, 1-heptene, and 1-octene; further preferably, the co-monomer of the co-polypropylene is selected from ethylene and/or 1-butene; and further preferably, the co-polypropylene is formed by propylene and ethylene.

In the polypropylene graft containing an acid anhydride group, the alkenyl-containing polymeric monomer is selected from at least one of monomers having a structure shown in formula VII,

formula VII

In formula VII, $R_1$, $R_2$ and $R_3$ each are independently selected from H, substituted or unsubstituted alkyl; and $R_4$ is selected from a group consisting of substituted or unsubstituted alkyl, substituted or unsubstituted alkoxy, substituted or unsubstituted aryl, substituted or unsubstituted ester group, substituted or unsubstituted carboxyl, substituted or unsubstituted cycloalkyl or heterocyclyl, cyano group.

Preferably, $R_1$, $R_2$ and $R_3$ each are independently selected from H, substituted or unsubstituted $C_1$-$C_6$ alkyl; and more preferably, $R_1$, $R_2$ and $R_3$ each are independently selected from H, substituted or unsubstituted $C_1$-$C_3$ alkyl. Preferably, $R_4$ is selected from a group consisting of substituted or unsubstituted $C_1$-$C_{20}$ alkyl, substituted or unsubstituted $C_1$-$C_{20}$ alkoxy, substituted or unsubstituted $C_6$-$C_{20}$ aryl, substituted or unsubstituted $C_1$-$C_{20}$ ester group, substituted or unsubstituted $C_1$-$C_{20}$ carboxyl, substituted or unsubstituted $C_3$-$C_{20}$ cycloalkyl or heterocyclyl, cyano group, and the substituent group is halogen, hydroxyl, amino, $C_1$-$C_6$ alkyl, $C_3$-$C_6$ cycloalkyl; further preferably, $R_4$ is selected from a group consisting of substituted or unsubstituted $C_1$-$C_{12}$ alkyl, substituted or unsubstituted $C_1$-$C_{18}$ alkoxy, substituted or unsubstituted $C_6$-$C_{12}$ aryl, substituted or unsubstituted $C_1$-$C_{12}$ ester group, substituted or unsubstituted $C_1$-$C_{12}$ carboxyl, substituted or unsubstituted $C_3$-$C_{12}$ cycloalkyl or heterocyclyl, cyano group, and the substituent group is halogen, $C_1$-$C_6$ alkyl, $C_3$-$C_6$ cycloalkyl; and more preferably, $R_4$ is selected from a group consisting of substituted or unsubstituted $C_1$-$C_6$ alkyl, substituted or unsubstituted $C_1$-$C_{12}$ alkoxy, substituted or unsubstituted $C_6$-$C_8$ aryl, substituted or unsubstituted $C_1$-$C_6$ ester group, substituted or unsubstituted $C_1$-$C_6$ carboxyl, substituted or unsubstituted $C_3$-$C_6$ cycloalkyl or heterocyclyl, cyano group. Preferably, heterocyclyl is selected from a group consisting of imidazolyl, pyrazolyl, carbazolyl, pyrrolidone group, pyridinyl, piperidyl, caprolactam group, pyrazinyl, thiazolyl, purinyl, morpholinyl, and oxazolinyl.

In the polypropylene graft containing an acid anhydride group, $R_1$, $R_2$ and $R_3$ each are independently selected from H, substituted or unsubstituted $C_1$-$C_6$ alkyl;

$R_4$ is selected from a group shown in formula VIII, a group shown in formula IX, a group shown in formula X, a group shown in formula XI, a combination of the group shown in formula XI and a group shown in formula XII, a heterocyclyl group;

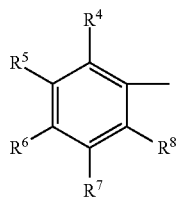

formula VII

In formula VII, $R_4$-$R_8$ each are independently selected from a group consisting of H, halogen, hydroxyl, amino, phosphoric acid group, sulfonic acid group, substituted or unsubstituted $C_1$-$C_{12}$ alkyl, substituted or unsubstituted $C_3$-$C_{12}$ cycloalkyl, substituted or unsubstituted $C_1$-$C_{12}$ alkoxy, substituted or unsubstituted $C_1$-$C_{12}$ ester group, substituted or unsubstituted $C_1$-$C_{12}$ amino, and the substituent group is selected from a group consisting of halogen, hydroxyl, amino, phosphoric acid group, sulfonic acid group, $C_1$-$C_{12}$ alkyl, $C_3$-$C_{12}$ cycloalkyl, $C_1$-$C_{12}$ alkoxy, $C_1$-$C_{12}$ ester group, $C_1$-$C_{12}$ amino; and preferably, $R_4$-$R_8$ each are independently selected from a group consisting of H, halogen, hydroxyl, amino, substituted or unsubstituted $C_1$-$C_6$ alkyl, substituted or unsubstituted $C_1$-$C_6$ cycloalkyl;

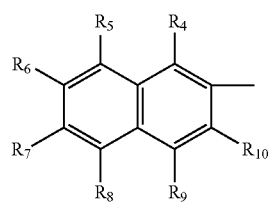

formula IX

In formula IX, $R_4$-$R_{10}$ each are independently selected from a group consisting of H, halogen, hydroxyl, amino, phosphoric acid group, sulfonic acid group, substituted or unsubstituted $C_1$-$C_{12}$ alkyl, substituted or unsubstituted $C_3$-$C_{12}$ cycloalkyl, substituted or unsubstituted $C_1$-$C_{12}$ alkoxy, substituted or unsubstituted $C_1$-$C_{12}$ ester group, substituted or unsubstituted $C_1$-$C_{12}$ amino, and the substituent group is selected from a group consisting of halogen, hydroxyl, amino, phosphoric acid group, sulfonic acid group, $C_1$-$C_{12}$ alkyl, $C_3$-$C_{12}$ cycloalkyl, $C_1$-$C_{12}$ alkoxy, $C_1$-$C_{12}$ ester group, and $C_1$-$C_{12}$ amino; and preferably, $R_4$-$R_{10}$ each are independently selected from a group consisting of H, halogen, hydroxyl, amino, substituted or unsubstituted $C_1$-$C_6$ alkyl, substituted or unsubstituted $C_1$-$C_6$ cycloalkyl, and the substituent group is selected from a group consisting of halogen, hydroxyl, amino, $C_1$-$C_6$ alkyl, and $C_1$-$C_6$ cycloalkyl;

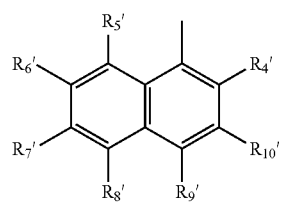

formula X in which formula X, $R_4'$-$R_{10}'$ each are independently selected from a group consisting of H, halogen, hydroxyl, amino, phosphoric acid group, sulfonic acid group, substituted or unsubstituted $C_1$-$C_{12}$ alkyl, substituted or unsubstituted $C_3$-$C_{12}$ cycloalkyl, substituted or unsubstituted $C_1$-$C_{12}$ ester group, substituted or unsubstituted $C_1$-$C_{12}$ amino, and the substituent group is selected from a group consisting of halogen, hydroxyl, amino, phosphoric acid group, sulfonic acid group, $C_1$-$C_{12}$ alkyl, $C_3$-$C_{12}$ cycloalkyl, $C_1$-$C_{12}$ alkoxy, $C_1$-$C_{12}$ ester group, $C_1$-$C_{12}$ amino; and preferably, $R_4'$-$R_{10}'$ each are independently selected from a group consisting of H, halogen, hydroxyl, amino, substituted or unsubstituted $C_1$-$C_6$ alkyl, substituted or unsubstituted $C_1$-$C_6$ alkoxy, and the substituent group is selected from a group consisting of halogen, hydroxyl, amino, $C_1$-$C_6$ alkyl, $C_1$-$C_6$ alkoxy;

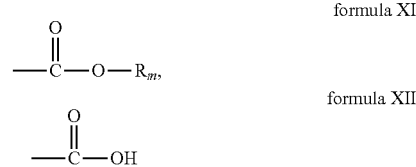

formula XI formula XII

In formula XI, $R_m$ is selected from at least one of the following substituted or unsubstituted groups: $C_1$-$C_{20}$ linear alkyl, $C_3$-$C_{20}$ branched alkyl, $C_3$-$C_{12}$ cycloalkyl, $C_3$-$C_{12}$ epoxide alkyl; and the substituent group is selected from at least one of a group consisting of halogen, amino and hydroxyl.

In the polypropylene graft containing an acid anhydride group, the alkenyl-containing polymeric monomer is selected from at least one of a group consisting of vinyl acetate, styrene, α-methylstyrene, (methyl) acrylate, vinyl-alkyl ether, vinylpyrrolidone, vinylpyridine, vinylimidazole and acrylonitrile; the (methyl) acrylate is preferably at least one of a group consisting of (methyl) methyl acrylate, (methyl) ethyl acrylate and (methyl) glycidyl acrylate; preferably, the alkenyl-containing polymeric monomer is selected from at least one of a group consisting of vinyl acetate, styrene, and α-methylstyrene; and further preferably, the alkenyl-containing polymeric monomer is styrene.

In the polypropylene graft containing an acid anhydride group, a molar ratio of a structural unit derived from the anhydride monomer to a structural unit derived from the alkenyl-containing polymeric monomer is 1:1-20, and preferably 1:1-10.

In the polypropylene graft containing an acid anhydride group, the acid anhydride is selected from an acid anhydride having at least one olefin unsaturation degree; and preferably, the acid anhydride is selected from maleic anhydride and/or itaconic anhydride; and further preferably, the acid anhydride is maleic anhydride.

According to specific embodiments of the thermoplastic composite material in the present invention, the polypropylene graft heterocyclyl ring modified material is polypropylene-g-styrene/maleic anhydride. A melt flow rate of polypropylene-g-styrene/maleic anhydride under conditions of 230° C. and 2.16 kg load is 2-8 g/10 min, and a content of the structural unit in the grafting state is 1-8%.

According to other embodiments of the thermoplastic composite material in the present invention, the electrical insulation modifier is a polypropylene graft heterocyclyl ring modified material. The polypropylene graft heterocyclyl ring modified material includes a structural unit derived from co-polypropylene and a structural unit derived from a heterocyclyl ring monomer containing alkenyl. Based on the weight of the polypropylene graft heterocyclyl ring modified material, a content of a structural unit derived from the heterocyclyl ring monomer containing alkenyl and in the grafting state in the polypropylene graft heterocyclyl ring modified material is wt %, preferably 0.5-4 wt %. Co-polypropylene has the following features: a content of a co-monomer is 0.5-40 mol %, preferably 0.5-30 mol %, and more preferably 4-25 mol %; a content of a xylene soluble substance is 2-80 wt %; a content of the co-monomer in the soluble substance is 10-70 wt %; and an intrinsic viscosity ratio of the soluble substance to polypropylene is 0.3-5.

A melt flow rate of the polypropylene graft heterocyclyl ring modified material under conditions of 230° C. and 2.16 kg load is 0.01-30 g/10 min, preferably 0.05-20 g/10 min, further preferably 0.1-10 g/10 min, and more preferably 0.2-8 g/10 min.

The heterocyclyl ring monomer containing alkenyl may be any heterocyclyl ring compound containing alkenyl that can be polymerized by a free radical, and the heterocyclyl ring compound containing alkenyl may be selected from at least one of a group consisting of imidazole containing an alkenyl substituent, pyrazole containing an alkenyl substituent, carbazole containing an alkenyl substituent, pyrrolidone containing an alkenyl substituent, pyridine or a pyridine salt containing an alkenyl substituent, piperidine containing an alkenyl substituent, caprolactam containing an alkenyl substituent, pyrazine containing an alkenyl substituent, thiazole containing an alkenyl substituent, purine containing an alkenyl substituent, morpholine containing an alkenyl substituent, and oxazoline containing an alkenyl substituent. Preferably, the heterocyclyl ring monomer containing alkenyl is a heterocyclyl ring monomer containing mono-alkenyl.

Specifically, the heterocyclyl ring monomer containing alkenyl may be selected from at least one of a group consisting of 1-vinylimidazole, 2-methyl-1-vinylimidazole, N-allylimidazole, 1-vinylpyrazole, 3-methyl-1-vinylpyrazole, vinylcarbazole, N-vinylpyrrolidone, 2-vinylpyridine, 3-vinylpyridine, 4-vinylpyridine, 2-methyl-5-vinylpyridine, vinylpyridine N oxide, vinylpyridine salt, vinylpiperidine, N-vinylcaprolactam, 2-vinylpyrazine, N-vinylpiperazine, 4-methyl-5-vinylthiazole, N-vinylpurine, vinylmorpholine, and vinyloxazoline.

A second aspect of the present invention provides a preparation method for a thermoplastic composite material, and the method includes the following steps:
- step A of obtaining a first component melt by melting a first thermoplastic resin and a first auxiliary agent;
- step B of forming a filamentous core layer product by subjecting continuous fiber bundles and the first component melt to a first impregnation processing;
- step C of obtaining a second component melt by melting a second thermoplastic resin and an optional second auxiliary agent; and
- step D of forming a resin layer continuously wrapping a core layer by subjecting the filamentous core layer product and the second component melt to a second impregnation processing.

According to some embodiments of the preparation method in the present invention, the preparation method may be performed on the production line continuously so as to obtain a continuous filamentous product. Such a filamentous product may be directly stored and used, and may also be cut into strips, rods or granules of a certain length.

According to some embodiments of the preparation method in the present invention, mixing conditions in step A include a temperature of 40-60° C. and a time length of 0.5-20 min, preferably 1-10 min, and more preferably 3-5 min.

According to some embodiments of the preparation method in the present invention, a melting temperature in step A is 200-380° C. In the present invention, the time length of melting may have a broader selection range, so as to enable sufficient melting of the first thermoplastic resin and the first auxiliary agent and thereby obtain the melt.

According to some embodiments of the preparation method in the present invention, preferably, in step B, before subjecting continuous fibers and the first component melt to the first impregnation processing, subjecting the continuous fibers to a dispersing processing and a preheating processing is also included, and a temperature of the preheating processing is preferably 80-250° C. The dispersing processing in the present invention uses the conventional fiber dispersing processing in the art.

According to some embodiments of the preparation method in the present invention, mixing conditions in step C include a temperature of 40-60° C. and a time length of 0.5-20 min, preferably 1-10 min, and more preferably 3-5 min.

According to some embodiments of the preparation method in the present invention, a melting temperature in step C is 200-380° C. In the present invention, the time length of melting may have a broader selection range, so as to enable sufficient melting of the second thermoplastic resin and the optional second auxiliary agent.

According to some embodiments of the preparation method in the present invention, the first impregnation processing in step B may be performed in a first impregnation mold. The first impregnation mold is an adjustable impregnation mold, and includes a fiber inlet, a fiber outlet, and a melt flow channel. The first impregnation mold is provided, in a mold cavity, with at least one first filament guiding roller. The first filament guiding roller is movable between the fiber inlet and the fiber outlet; and/or the first filament guiding roller is movable in a direction perpendicular to a connecting line of the fiber inlet and the fiber outlet.

According to some embodiments of the preparation method in the present invention, the first impregnation processing in step B may be performed in a second impregnation mold. The second impregnation mold is a combined impregnation mold, and includes a first module, an intermediate module, and a second module which are connected in series. The first module is provided with a fiber inlet and a first module flow channel, and the second module is provided with a fiber outlet and a second module flow channel, the intermediate module is provided with an intermediate module flow channel. After the first module, the intermediate module, and the second module are connected in series, the first module flow channel, the intermediate module flow channel, and the second module flow channel are in communication with each other so as to form a combined flow channel for passage of the fibers.

According to some embodiments of the preparation method in the present invention, the first impregnation processing in step B may also be performed in a third impregnation mold. The third impregnation mold is an intensely turbulent impregnation mold, and includes a fiber inlet channel, an impregnation outlet, and a melt gap flow channel. The fiber inlet channel, the impregnation outlet, and the melt gap flow channel are all in communication with a mold cavity inside the third impregnation mold. The third impregnation mold is provided, in the mold cavity, with a second filament guiding roller, and the second filament guiding roller includes at least one actuating filament guiding roller which is actuated to rotate by an actuating device.

The first impregnation mold, the second impregnation mold, and the third impregnation mold used in the present invention is described in Chinese patent application CN202011193483.3, CN202011191450.5, and CN202011199839.4, the content of which is incorporated herein by reference to the extent consistent with the present invention.

It should be noted that, the first impregnation mold, the second impregnation mold, and the third impregnation mold in the present invention can be applied to any existing manufacturing system and preparation technology of the thermoplastic composite material, in particular to any existing manufacturing system and preparation technology of a continuous fibers reinforced thermoplastic composite material.

According to some embodiments of the preparation method in the present invention, the second impregnation processing in step D may be performed in a forming mold. The forming mold is formed by a core portion, an outer casing, and an outer casing opening mold plate. The core portion is located inside the outer casing, and forms a forming cavity with the outer casing. A resin melt may be fed into the forming cavity from a bottom, a top, or two sides of the outer casing. The core portion can move back and forth in the outer casing, and a pressure of the melt in the forming cavity is determined by adjusting a size of a space of the formed forming cavity. The pressure of the melt in the forming cavity may also be adjusted by the size of the intersection angle between the core portion and the outer casing.

A working principle of the forming mold is as follows: a material strip which form an inner layer impregnation material after passing through the impregnation mold is guided through an aperture in a central part of the core portion; then forming of a composite structure by an inner layer material and an outer layer material is performed in a forming cavity formed by the core portion and the outer casing and filled with a mixed melt; and finally the formed composite structure is guided out through the outer casing opening mold plate.

According to some embodiments of the preparation method in the present invention, after step D, the obtained thermoplastic composite material are also subjected to a processing of pulling-out, a processing of stretching into strips, a processing of cooling, a processing of drying, and a processing of cutting into granules. Conditions for the processing of pulling-out, the processing of stretching into strips, the processing of cooling, the processing of drying, and the processing of cutting into granules are not specifically limited, and are all in a broader selection range, so as to obtain a thermoplastic composite material meeting different specification requirements.

According to some embodiments of the preparation method in the present invention, in the inner layer material, an amount of the first thermoplastic resin is 1-90 parts by weight, and an amount of the fiber bundles is 10-110 parts by weight.

In some specific embodiments, in the inner layer material, the amount of the first thermoplastic resin may be 1 part by weight, 10 parts by weight, 20 parts by weight, 25 parts by weight, 30 parts by weight, 40 parts by weight, 45 parts by weight, 50 parts by weight, 55 parts by weight, 60 parts by weight, 70 parts by weight, 80 parts by weight, 90 parts by weight, or in a range formed by these values; and in some specific embodiments, the amount of the fiber bundles may be 1 part by weight, 10 parts by weight, 20 parts by weight, 25 parts by weight, 30 parts by weight, 40 parts by weight, 50 parts by weight, 60 parts by weight, 70 parts by weight, parts by weight, 90 parts by weight, 100 parts by weight, 110 parts by weight, or in a range formed by these values.

In some preferred embodiments, in the inner layer material, the amount of the first thermoplastic resin may be 20-70 parts by weight, preferably 20-55 parts by weight, and more preferably 24-45 parts by weight; and/or the amount of the fiber bundles may be 20-110 parts by weight, preferably 25-110 parts by weight.

According to some embodiments of the preparation method in the present invention, in the outer layer material, an amount of the second thermoplastic resin may be 1-110 parts by weight.

In some specific embodiments, in the outer layer material, the amount of the second thermoplastic resin may be 1 part by weight, 10 parts by weight, 20 parts by weight, 30 parts by weight, 40 parts by weight, 45 parts by weight, 50 parts by weight, 60 parts by weight, 65 parts by weight, 70 parts by weight, 75 parts by weight, 80 parts by weight, 85 parts by weight, 90 parts by weight, 95 parts by weight, 100 parts by weight, 105 parts by weight, 110 parts by weight, or in a range formed by these values.

In some preferred embodiments, in the outer layer material, the amount of the second thermoplastic resin may be 10-90 parts by weight, preferably 40-90 parts by weight.

According to some specific embodiments of the preparation method in the present invention, in the inner layer material, the amount of the first thermoplastic resin is 1-90 parts by weight, preferably 20-70 parts by weight, more preferably 20-55 parts by weight, and further preferably 24-45 parts by weight; and/or the amount of the fiber bundles is 10-99 parts by weight, preferably 20-80 parts by weight, and more preferably 25-50 parts by weight.

According to other specific embodiments of the preparation method in the present invention, in the inner layer material, the amount of the first thermoplastic resin is 50-70 parts by weight, further preferably 50-60 parts by weight; and/or the amount of the fiber bundles is 90-110 parts by weight, preferably 100-110 parts by weight; and/or in the outer layer material, the amount of the second thermoplastic resin is 90-110 parts by weight, preferably 95-105 parts by weight.

According to some embodiments of the preparation method in the present invention, in the inner layer material, a weight ratio of fiber bundles to the first thermoplastic resin is 0.25-6:1. For example, in the inner layer material, the weight ratio of the fiber bundles to the first thermoplastic resin is 0.25:1, 0.3:1, 0.35:1, 0.4:1, 0.45:1, 0.5:1, 0.55:1, 0.6:1, 0.65:1, 0.7:1, 0.8:1, 1:1, 1.2:1, 1.5:1, 1.7:1, 1.8:1, 1.9:1, 2:1, 2.5:1, 3:1, 3.5:1, 4:1, 4.5:1, 5:1, 6:1, or in a range formed by these values.

In some preferred embodiments, in the inner layer material, the weight ratio of the fiber bundles to the first thermoplastic resin may be 0.35-4.5:1, preferably 0.43-4.5:1.

In different embodiments of the present invention, the number of layers of the outer layer material is not limited. There may be one layer or multiple layers in the outer layer material. When there are multiple layers in the outer layer material, the multiple layers of the outer layer material may be formed by one type of outer layer material, and may also be formed by various types of outer layer material.

According to some embodiments of the preparation method in the present invention, the first thermoplastic resin and the second thermoplastic resin may be the same or different, and each are independently selected from at least one of a group consisting of polypropylene, polyethylene, polystyrene, polyvinyl chloride, polyacrylonitrile-butadiene-styrene copolymer, polyacrylonitrile-styrene copolymer, polyformaldehyde, polyamide, polyethylene terephthalate, polybutylene terephthalate, polymethyl methacrylate, polycarbonate, polyphenyl ether, polyurethane, polyether ether ketone, polyphenylene sulfide, and alloy polymers thereof.

According to preferred embodiments of the preparation method in the present invention, the first thermoplastic resin and the second thermoplastic resin each are independently selected from at least one of a group consisting of polypropylene, polyethylene, polyamide (also referred to as nylon), polyethylene terephthalate (PET), polybutylene terephthalate (PBT), polyphenylene sulfide, polyurethane, and polyether ether ketone (PEEK).

According to preferred embodiments of the preparation method in the present invention, the first thermoplastic resin and the second thermoplastic resin each are independently selected from at least one of a group consisting of homo-polypropylene, co-polypropylene, a mixture of homo-polypropylene and co-polypropylene, nylon 6 (PA6), nylon 66 (PA66), and a mixture of nylon 6 and nylon 66.

According to other embodiments of the preparation method in the present invention, the first thermoplastic resin and the second thermoplastic resin may also be selected from a group consisting of a thermoplastic polyurethane elastomer (TPU) and/or high temperature nylon (PPA).

According to some embodiments of the preparation method in the present invention, a melt flow rate of the first thermoplastic resin under conditions of 230° C. and 2.16 kg load is 60-8000 g/10 min. For example, the melt flow rate of the first thermoplastic resin under conditions of 230° C. and 2.16 kg load may be 60 g/10 min, 100 g/10 min, 200 g/10 min, 450 g/10 min, 500 g/10 min, 1000 g/10 min, 1500 g/10 min, 2000 g/10 min, 3000 g/10 min, 4000 g/10 min, 5000 g/10 min, 6000 g/10 min, 7000 g/10 min, 7500 g/10 min, 8000 g/10 min, or in a range formed by these values.

In some preferred embodiments, the melt flow rate of the first thermoplastic resin under conditions of 230° C. and 2.16 kg load may be 100-8000 g/10 min, preferably 1000-7500 g/10 min, and more preferably 1900-7500 g/10 min.

According to some embodiments of the preparation method in the present invention, a melt flow rate of the second thermoplastic resin under conditions of 230° C. and 2.16 kg load is g/10 min. For example, the melt flow rate of the second thermoplastic resin under conditions of 230° C. and 2.16 kg load may be 0.1 g/10 min, 1 g/10 min, 1.5 g/10 min, 3 g/10 min, g/10 min, 20 g/10 min, 30 g/10 min, 40 g/10 min, 45 g/10 min, 50 g/10 min, 55 g/10 min, 60 g/10 min, 70 g/10 min, 80 g/10 min, 90 g/10 min, 100 g/10 min, 450 g/10 min, 500 g/10 min, 800 g/10 min, 1000 g/10 min, 1500 g/10 min, 1900 g/10 min, 2500 g/10 min, 3000 g/10 min, 4000 g/10 min, 5000 g/10 min, 6000 g/10 min, 7000 g/10 min, 8000 g/10 min, or in a range formed by these values.

In some preferred embodiments, the melt flow rate of the second thermoplastic resin under conditions of 230° C. and 2.16 kg load may be 3-55 g/10 min or 450-8000 g/10 min, preferably 3-45 g/10 min or 1900-8000 g/10 min.

In different embodiments of the present invention, the melt flow rate of the first thermoplastic resin and the melt flow rate of the second thermoplastic resin are not limited specifically, and the melt flow rate of the first thermoplastic resin and the melt flow rate of the second thermoplastic resin may be selected according a desired performance. In particular, the inventor of the present application has found that a thermoplastic composite material which has both a high surface quality performance and a comprehensive performance can be prepared according to preparation conditions (for example, the melt flow rate) of the present invention. For example, when the melt flow rate of the first thermoplastic resin is greater than the melt flow rate of the second thermoplastic resin, the thermoplastic composite material may have an improved mechanical property; and on the contrary, when the melt flow rate of the second thermoplastic resin is greater than the melt flow rate of the first thermoplastic resin, the thermoplastic composite material may have an improved glossiness.

According to some preferred embodiments of the preparation method in the present invention, the melt flow rate of the first thermoplastic resin under conditions of 230° C. and 2.16 kg load is 60-450 g/10 min, for example, 60-200 g/10 min; and the melt flow rate of the second thermoplastic resin under conditions of 230° C. and 2.16 kg load is 3-55 g/10 min or 450-8000 g/10 min. In some specific embodiments, the melt flow rate of the first thermoplastic resin under conditions of 230° C. and 2.16 kg load is 60-450 g/10 min; and the melt flow rate of the second thermoplastic resin under conditions of 230° C. and 2.16 kg load is 800-8000 g/10 min.

According to other preferred embodiments of the preparation method in the present invention, the melt flow rate of the first thermoplastic resin under conditions of 230° C. and 2.16 kg load is equal to or greater than 450 g/10 min, in particular greater than 450 g/10 min, and the melt flow rate of the second thermoplastic resin under conditions of 230° C. and 2.16 kg load is less than 100 g/10 min, preferably 1.5-55 g/10 min, and more preferably 3-50 g/10 min.

According to some embodiments of the preparation method in the present invention, a weight ratio of the second thermoplastic resin to the first thermoplastic resin is 0.05-12.5:1. For example, the weight ratio of the second thermoplastic resin to the first thermoplastic resin may be 0.05:1, 0.1:1, 0.14:1, 0.15:1, 0.18:1, 0.2:1, 0.25:1, 0.3:1, 0.5:1, 0.8:1, 1:1, 1.2:1, 1.3:1, 1.4:1, 1.7:1, 2:1, 2.5:1, 3:1, 3.5:1, 4:1, 5:1, 8:1, 10:1, 12.5:1, or in a range formed by these values.

In some preferred embodiments, the weight ratio of the second thermoplastic resin to the first thermoplastic resin may be 0.1-4:1, preferably 0.14-3.5:1.

According to preferred embodiments of the preparation method in the present invention, when the melt flow rate of the second thermoplastic resin under conditions of 230° C. and 2.16 kg load is 800-8000 g/10 min, the weight ratio of the second thermoplastic resin to the first thermoplastic resin is less than 0.25:1, preferably less than 0.18:1, and more preferably less than 0.15:1.

According to some embodiments of the preparation method in the present invention, when the first thermoplastic resin and the second thermoplastic resin are selected from at least one of a group consisting of nylon 6, nylon 66, and a mixture of nylon 6 and nylon 66, a viscosity of the selected nylon 6 and nylon 66 is 1.8-3.5.

According to specific embodiments of the preparation method in the present invention, the first thermoplastic resin and the second thermoplastic resin may be home-made, and may also be commercially available.

For example, a polypropylene resin commercially available from Sinopec Yangzi Petrochemical Co. Ltd. with a designation of PPB-M100-GH, a polypropylene resin commercially available from Sinopec East China Oil & Gas Company with a designation of M60RHC, and nylon 6 commercially available from Sinopec Baling Petrochemical Company with a designation of PA6-BL3200H may be used as the first thermoplastic resin.

For example, a polypropylene resin commercially available from Sinopec Yangzi Petrochemical Co. Ltd. with a designation of PPB-M100-GH, a polypropylene resin commercially available from Sinopec Maoming Petrochemical Company with a designation of PPH-T03, a polypropylene resin commercially available from Sinopec East China Oil & Gas Company with a designation of M50RH, a polypropylene resin commercially available from Sinopec Yanshan Petrochemical Company with a designation of K8303, a polypropylene resin commercially available from Hunan Shengjin New Material Co. Ltd. with a designation of PF1500, or a polypropylene resin commercially available from Sinopec Shijiazhuang Refining & Chemical Company with a designation of PPH-Y450, and nylon 6 commercially available from Sinopec Baling Petrochemical Company with a designation of PA6-BL3200H may be used as the second thermoplastic resin.

According to some embodiments of the preparation method in the present invention, the fiber bundles are selected from at least one of a group consisting of glass fiber, carbon fiber, basalt fiber, aromatic polyamide fiber, stainless steel fiber, synthetic resin fiber, and mineral fiber.

According to preferred embodiments of the preparation method in the present invention, the glass fiber is a continuous glass fiber and/or a fixed length glass fiber.

According to some embodiments of the preparation method in the present invention, when the first thermoplastic resin and the second thermoplastic resin respectively having a mass of 100 parts by weight, the first auxiliary agent and the second auxiliary agent each independently include at least one of 0.5-15 parts by weight of a compatilizer, 0.05-3 parts by weight of an antioxidant, and 0.05-2.5 parts by weight of a lubricant. Preferably, the first auxiliary agent and the second auxiliary agent each include at least one of 1-15 parts by weight, preferably 1-6 parts by weight, and more preferably 3-6 parts by weight of the compatilizer, 0.1-1 parts by weight and preferably 0.1-0.5 parts by weight of the antioxidant, and 0.5-2.5 parts by weight of the lubricant.

According to some embodiments of the preparation method in the present invention, the compatilizer is selected from at least one of graft modified polymers of a polar monomer. Preferably, the polar monomer is selected from at least one of a group consisting of maleic anhydride, maleic anhydride derivative, propenoic acid, and acrylate derivative.

Preferably, the polymer is selected from at least one of a group consisting of polyethylene, polypropylene, ethylene-α-olefin copolymer, and propylene-α-olefin (the α-olefin other than propylene) copolymer.

According to some embodiments of the preparation method in the present invention, the lubricant is selected from at least one of a group consisting of ethylene bis stearamide, calcium stearate, polyethylene wax, pentaerythritol stearate, silicone, polyethylene glycol and fluorine-containing resin.

In different embodiments of the present invention, the first auxiliary agent may also include at least one of a group consisting of slip agent, antistatic agent, and plasticizer; and the second auxiliary agent may also include at least one of a group consisting of slip agent, antistatic agent, plasticizer, nucleating agent, light stabilizer, expansion flame retardant, heat stabilizer, color master and filler. The specific type and amount of the auxiliary agents are not limited, and the amount may have a broader selection range.

In some embodiments of the present invention, the preparation method in the present invention is performed in a thermoplastic composite material manufacturing system as shown in FIG. 2 or FIG. 3, and a specific structure and a connection manner of the thermoplastic composite material manufacturing system are described in the detailed description of the embodiments.

A third aspect of the present invention provides a use of the above thermoplastic composite material and the above preparation method in the industrial fields of automobile industry, machinery manufacturing, electronic and electrical appliances, chemical and environmental protection, aerospace communications and construction industry, preferably in large-size automobile parts and/or high precision electronic and electrical components, and more preferably in automobile front-end module and/or a full-plastic stern door inner plate. The use is not limited to this.

The Present Invention has the Following Beneficial Effects:

1. The thermoplastic composite material prepared in the present invention has a composite structure with a core layer and an outer layer, and such a composite system design based on various materials can achieve an effect of performance synergism among different components of the inner layer material and the outer layer material, can effectively improve the processing performance of the thermoplastic composite material and the lubricity between fibers and a resin matrix during injection molding, can improve the mobility of the fibers in the resin matrix so as to improve a binding state between the fibers and the resin matrix and reduce a separating state between the fibers and the resin matrix, and can improve the mobility of the entire material system, thereby greatly improving both the comprehensive performance and the surface quality of the thermoplastic composite material prepared and meanwhile reducing requirements of the injection molding processing and expanding the application range of the thermoplastic composite material. Thus, the thermoplastic composite material prepared in the present invention has a wide application prospect and economic significance.

2. The thermoplastic composite material in the present invention has a low cost, a short injection molding period, a high size stability of a work piece, and a high material strength and requires no second-time mixing during use; and a functional material may be added to a first component and/or the second component, in particular the second component (resin layer), so that the thermoplastic composite material in the present invention has wide applicability. Further, the outer layer material of the thermoplastic composite material in the present invention may contain no fiber, thereby having an advantage of good surface quality performance, and contains no floating fiber, thereby having an improved glossiness.

BRIEF DESCRIPTION OF THE DRAWINGS

The brief description of the drawings is provided for further understanding of the present invention, constitute a part of the description, and is provided for explaining the present invention along with the following detailed description of the embodiments, but do not constitute any limitation on the present invention. In the drawings.

Figure 1:
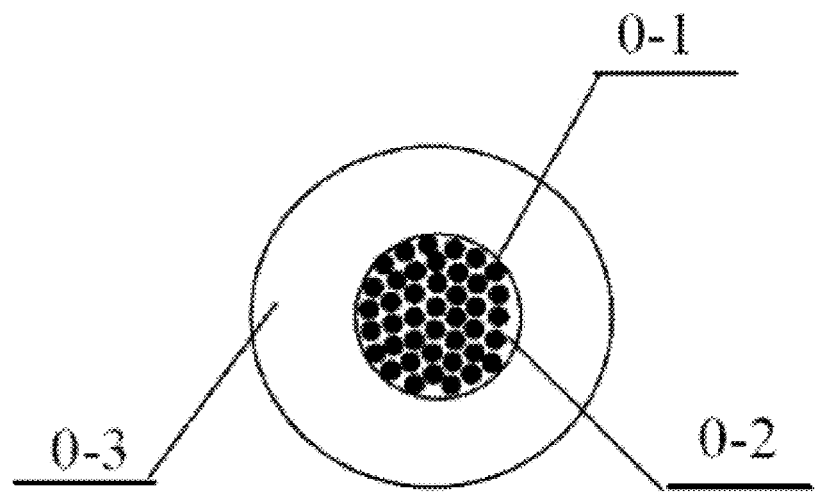
FIG. 1 is a schematic diagram of a structure of a thermoplastic composite material according to an embodiment of the present invention.

LIST OF REFERENCE NUMERALS 0-1. core layer; 0-2. fiber bundle; 0-3 resin layer;
1. fiber frame and fiber guiding device; 2. fiber pre-processing device; 3. first impregnation mold; 4. melting and plasticizing feeding device; 5. forming mold; 6. cooling sink; 7. dry machine; 8. tractor; 9. pelletizer; 10. collecting box;
A300. first impregnation mold head; A1. fiber inlet; A2. second sliding slot; A3. melt flow channel; A4. first sliding slot; A5. upper mold cover; A6. fiber outlet; A7. impregnation mold body; A8. first filament guiding roller;
B300. second impregnation mold head; B1. fiber inlet; B2. melt flow channel; B3. first module; B31. first module flow channel; B4. combined flow channel; B5. standardized joint; B6. intermediate module; B61. intermediate module flow channel; B7. second module; B71. second module flow channel; B8. fiber outlet;
C300. third impregnation mold head; C1. melt gap flow channel; C2. impregnation mold outer body; C3. fiber inlet channel; C4. actuating filament guiding roller; C5. actuated filament guiding roller; C6. impregnation outlet;
4-1. extruder I; 4-2. extruder II;
5-1. core portion; 5-2. outer casing; 5-3. outer casing opening mold plate; 5-4. material strip; 5-5. second resin inlet.

DETAILED DESCRIPTION OF THE EMBODIMENTS

In order to better understand the present invention, the present invention is described in detail in conjunction with the embodiments, and these embodiments are only illustrative and do not limit the application scope of the present invention.

Test Methods and Devices Used in Tests are as Follows:
(1) a tensile strength test is performed according to standard ISO527-2, and a tensile speed is 5 mm/min;
(2) a bending strength test is performed according to standard ISO178, and a bending speed is 2 mm/min;
(3) a notch impact strength test is performed according to standard ISO179;
(4) a surface glossiness test is performed according to standard ISO2813; and
(5) a volume resistivity is tested according to a method prescribed in GB/T 1410-2006.

Sources of some reagents used in the present invention are as follows:
(1) PPB-M100-GH, having a melt flow rate of 100 g/10 min under test conditions of 230° C. and 2.16 kg load and produced by Sinopec Yangzi Petrochemical Co. Ltd.;
(2) PF1500, having a melt flow rate of 1500 g/10 min under test conditions of 230° C. and 2.16 kg load and produced by Hunan Shengjin New Material Co. Ltd.;
(3) PPH-Y450, having a melt flow rate of 450 g/10 min under test conditions of 230° C. and 2.16 kg load and produced by Sinopec Shijiazhuang Refining & Chemical Company;
(4) BL3200H, having a viscosity of 1.8 and produced by Sinopec Baling Petrochemical Company;
(5) SE4805, an alkali-free glass fiber, having a diameter of 17 μm and a linear density 2400 tex and produced by Owens Corning (Shanghai) Glass Fiber Co. Ltd.;
(6) ER4301H, an alkali-free glass fiber, having a diameter of 17 μm and a linear density 2400 tex and produced by Chongqing Polycomp International Corporation;
(7) T700SC, a carbon fiber, having a filament bundle of 1200-50 C and produced by Toray Company of Japan;
(8) basalt fiber, having a single fiber diameter of 12 μm and produced by Mudanjiang Jinshi Basalt Fiber Co. Ltd.;
(9) PP-g-MAH, with a designation of BONDYRAM 1001 and produced by Polyram Plastics Industry Co. Ltd.;
(10) POE-g-MAH, with a designation of CMG9805 and produced by Shanghai Sunny Technology Co., Ltd.;
(11) NDZ12, produced by Nanjing Shuguang Chemical Group;
(12) XHY-501, produced by Nanjing Up Chemical Co., Ltd.;
(13) antioxidant 1010, produced by BASF Corporation;
(14) antioxidant 168, produced by BASF Corporation;
(15) XH-201, produced by Xianghe Paint Group;
(16) polypropylene-g-glycidyl methacrylate, having a melt flow rate of 5.47 g/10 min under test conditions of 230° C. and 2.16 kg load, a 4.05% content of a structural unit in a grafting state, and a grafting efficiency of 85%;
(17) polypropylene-g-styrene, having a melt flow rate of 6.37 g/10 min under test conditions of 230° C. and 2.16 kg load, a 4.74% content of a structural unit in a grafting state, and a grafting efficiency of 52%;
(18) polypropylene-g-vinyltriethoxysilane, having a melt flow rate of 1.15 g/10 min under test conditions of 230° C. and 2.16 kg load and a 1.03% content of a structural unit of a silane monomer in a grafting state;
(19) polypropylene-g-styrene/maleic anhydride, prepared by Sinopec Beijing Research Institute of Chemical Industry, having a melt flow rate of 5.84 g/10 min under test conditions of 230° C. and 2.16 kg load, a 0.84% content of a structural unit derived from a maleic anhydride monomer and an alkenyl-containing polymeric monomer and in a grafting state, and a grafting efficiency of 23%; and

(20) polypropylene-g-vinyl imidazole, having a melt flow rate of 7.98 g/10 min under test conditions of 230° C. and 2.16 kg load, a 3.45% content of vinyl imidazole structural unit in a grafting state, and a grafting efficiency of 46%.

The present invention is further described below with reference to the accompanying drawings.

FIG. 1 shows a structure of a thermoplastic composite material in the present invention. As shown in FIG. 1, the thermoplastic composite material in the present invention has a circular cross section, and includes a core layer 0-1 and a resin layer 0-3 from inside to outside. Fiber bundles 0-2 longitudinally oriented are distributed in the core layer 0-1, and the fiber bundles 0-2 are uniformly dispersed.

Figure 2:
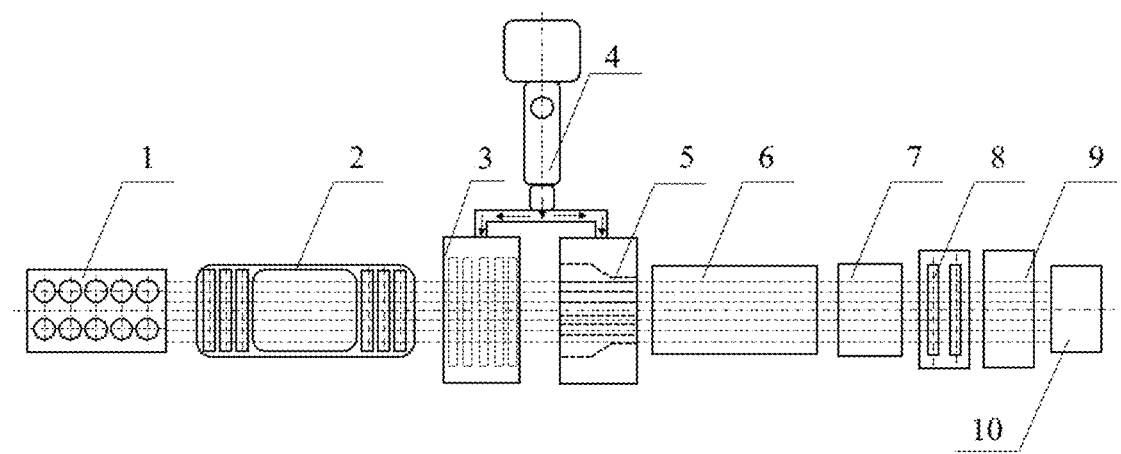
FIG. 2 is a schematic diagram of a structure of a manufacturing system of the thermoplastic composite material according to an embodiment of the present invention.
Figure 3:
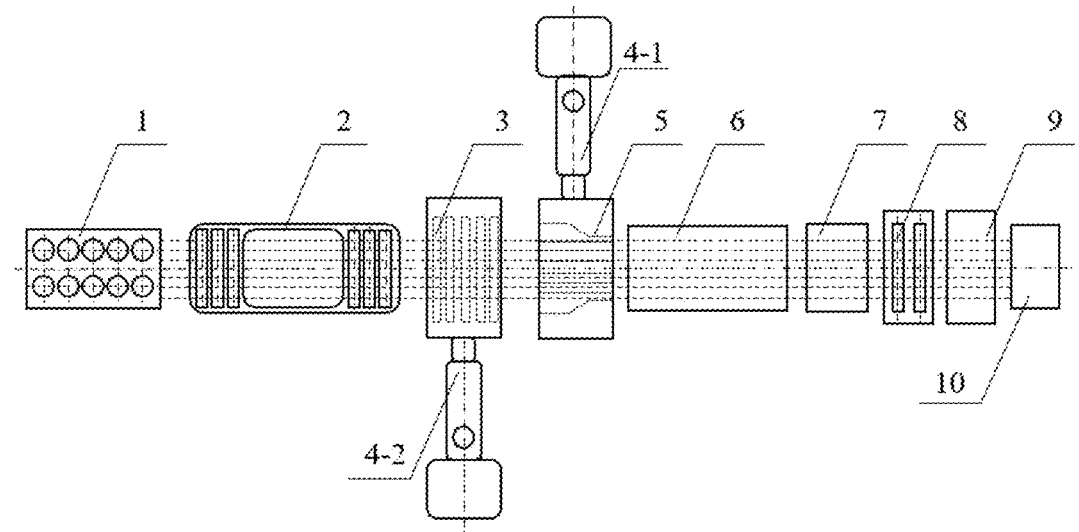
FIG. 3 is a schematic diagram of a structure of a manufacturing system of the thermoplastic composite material according to another embodiment of the present invention.

As shown in FIG. 2 and FIG. 3, the manufacturing system in the present invention includes a fiber frame and fiber guiding device 1, a fiber pre-processing device 2, a first impregnation mold 3, a melting and plasticizing feeding device 4, a forming mold 5, a cooling sink 6; a dry machine 7, a tractor 8, a pelletizer 9, a collecting box 10, and an electronic control system (not shown in the drawings) which are connected in series.

Figure 8:
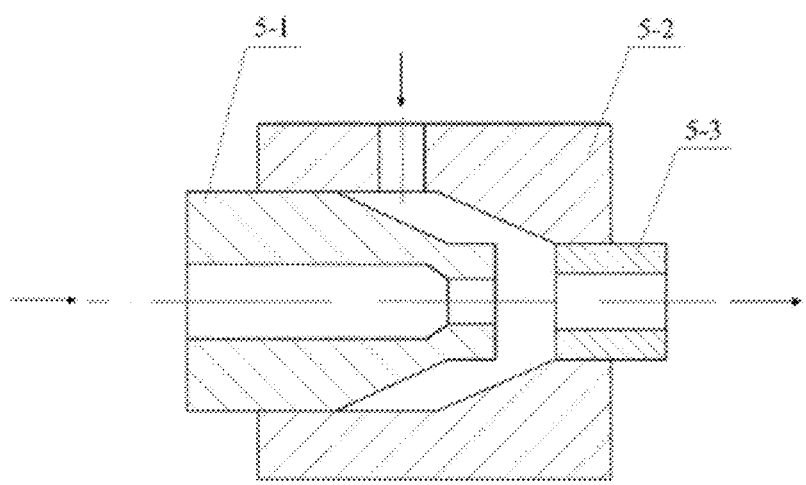
FIG. 8 is a sectional-view of a forming mold used in the second impregnation processing according to an embodiment of the present invention.

In the manufacturing system, the forming mold 5 is configured for forming of the composite material having a composite structure of an inner layer and an outer layer, and has a structure shown in FIG. 8.

In the manufacturing system, the first impregnation mold 3 is configured for impregnation of fibers and a resin melt.

Figure 4:
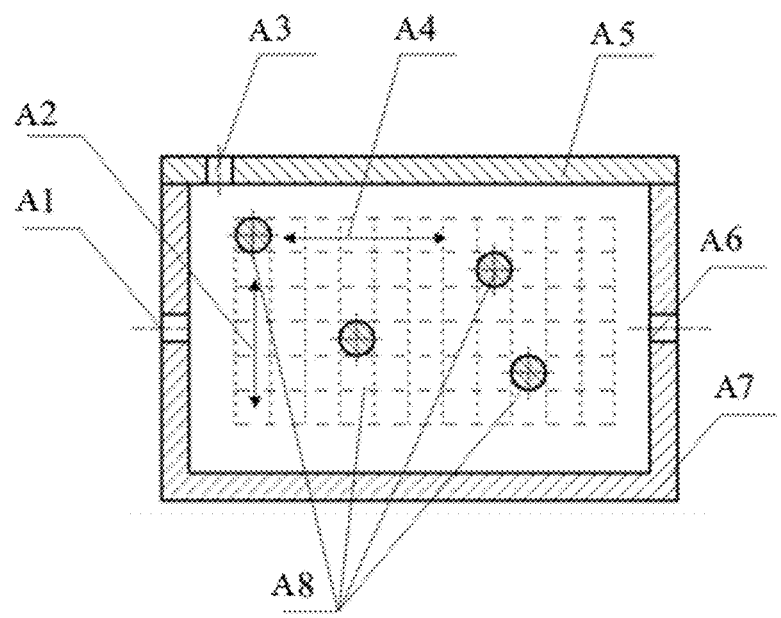
FIG. 4 is a sectional-view of a first impregnation mold according to an embodiment of the present invention.

As shown in FIG. 4, in one embodiment, the first impregnation mold is an impregnation device in which a position of a filament guiding roller is adjustable, and includes a first impregnation mold head A300. The first impregnation mold head A300 includes an impregnation mold body A7, a fiber inlet A1, a fiber outlet A6, and a melt flow channel A3. At least one first filament guiding roller A8 is provided in a mold cavity. The first filament guiding roller A8 is movable between the fiber inlet A1 and the fiber outlet A6, or the first filament guiding roller A8 is movable in a direction perpendicular to a connecting line between the fiber inlet A1 and the fiber outlet A6; or the first filament guiding roller A8 is movable between the fiber inlet A1 and the fiber outlet A6 and is movable in a direction perpendicular to a connecting line between the fiber inlet A1 and the fiber outlet A6.

Taking the rectangular first impregnation mold head A300 as an example, multiple first filament guiding rollers A8 are provided in the first impregnation mold head A300, and an axial direction of each first filament guiding roller A8 is a width direction of the first impregnation mold head A300. Thus, each first filament guiding roller A8 is movable in a length direction of the first impregnation mold head A300, and is also movable in a height direction, so as to change a position of the first filament guiding roller A8 in the first impregnation mold head A300.

It is understood that, the axial direction of first filament guiding roller A8 may also be the length direction of the first impregnation mold head A300. At this time, each first filament guiding roller A8 is movable in the width direction of the first impregnation mold head A300, and is also movable in the height direction of the first filament guiding roller A8, so as to change the position of the first filament guiding roller A8 in the first impregnation mold head A300.

Since fibers (fiber bundles) need to bypass the first filament guiding rollers A8 in the mold cavity one by one when travelling in the mold cavity of the first impregnation mold head A300, a traveling path of the fibers in the mold cavity can be changed by changing the position (a horizontal position, a vertical position, etc) of the first filament guiding roller A8 in the first impregnation mold head A300. In this way, when impregnation conditions required by the fibers are changed, there is no need to change a new mold, and only adjusting the position of the first filament guiding roller A8 in the first impregnation mold head A300 is needed, thereby improving the production efficiency and the production continuity. Meanwhile, the number of first impregnation mold heads A300 can be reduced, and the production cost can be saved.

Specifically, the inventive concept of the present invention lies in the realization of adjusting the position of the first filament guiding roller A8 by providing a slot in an inner wall of the mold cavity of the first impregnation mold head A300.

A first sliding slot A4 is provided in a first inner wall of the first impregnation mold head A300, and the first sliding slot A4 extends between the fiber inlet A1 and the fiber outlet A6 (the X axis direction shown in FIG. 4). The first filament guiding roller A8 moves along the first sliding slot A4 so as to change the horizontal position of the first filament guiding roller A8 in the first impregnation mold head A300.

Further, a second sliding slot A2 is provided in the first inner wall of the first impregnation mold head A300, and the second sliding slot A2 extends in a direction perpendicular to the first sliding slot A4 (i.e., the Y axis direction shown in FIG. 4). The first filament guiding roller A8 moves along the second sliding slot A2 so as to change the vertical position of the first filament guiding roller A8 in the mold head.

It should be noted that the first sliding slot A4 and the second sliding slot A2 may be in communication with each other. Accordingly, the first filament guiding roller A8 may be moved longitudinally or laterally at random, so as to change the position of the first filament guiding roller A8.

A cross section of the first sliding slot A4 and the second sliding slot A2 may be in a shape of a trapezoid, a circle, an arc, or a rectangle, and the present invention does not limit the shape.

An adjustment device (not shown in the drawings) is provided at both ends of the first filament guiding roller A8, and the adjustment device is configured to adjust an axial length of the first filament guiding roller A8. A minimum axial length of the first filament guiding roller A8 is less than a distance between the first inner wall and a second inner wall, and a maximum axial length of the first filament guiding roller A8 is greater than the distance between the first inner wall and the second inner wall.

Figure 5:
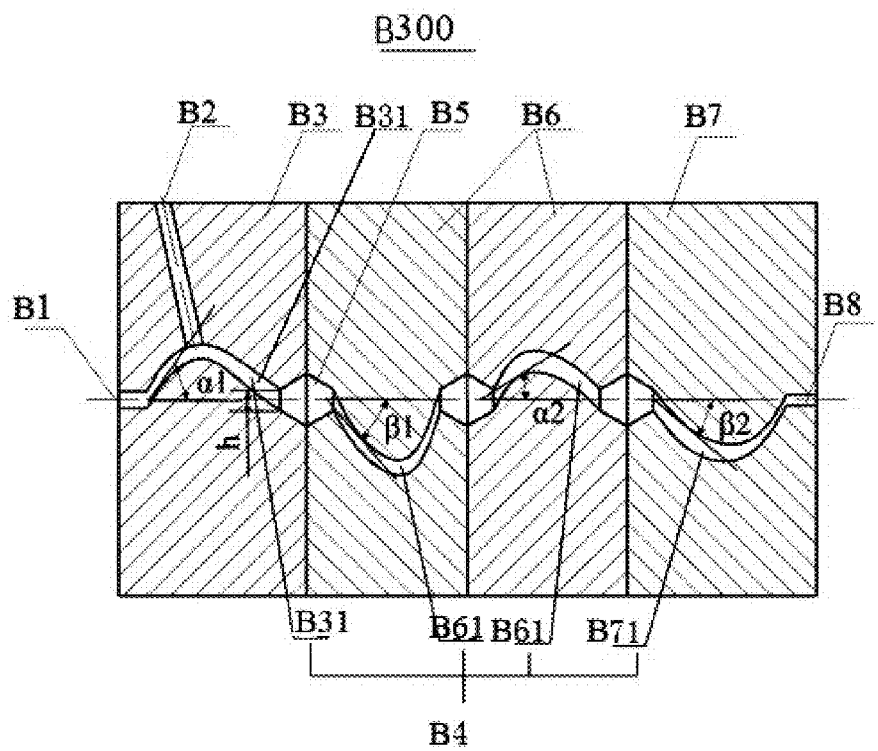
FIG. 5 is a sectional-view of a second impregnation mold according to an embodiment of the present invention.

As shown in FIG. 5, in another embodiment of the present invention, the second impregnation mold is a combined impregnation mold and includes a second impregnation mold head B300, and the second impregnation mold head B300 includes a first module B3, an intermediate module B6, and a second module B7 which are connected in series. The first module B3 is provided with a fiber inlet B1 and a first module flow channel B31, and the second module B7 is provided with a fiber outlet B8 and a second module flow channel B71, the intermediate module B6 is provided with an intermediate module flow channel B61.

After the first module B3, the intermediate module B6, and the second module B7 are connected in series, the first module flow channel B31, the intermediate module flow channel B61, and the second module flow channel B71 are in communication with each other so as to form a combined flow channel B4 for passage of the fibers. The number of intermediate modules B6 is at least one. That is, the first module B3 is a head module, and the second module B7 is a tail module, one or more intermediate modules B6 are provided between the first module B3 and the second module B7. It should be noted that, these intermediate modules B6 are also connected in series.

In other words, the number of the intermediate modules B6 may be increased or reduced according to needs, so as to form the combined second impregnation mold head B300 by combining different intermediate modules B6 when required impregnation conditions change, thereby improving the production continuity and the production efficiency and saving additional cost for mold opening.

Moreover, shape parameters (for example, the curvature) of a formed combined flow channel B4 can be changed by selecting different intermediate modules B6, so as to change a flow path of the fibers and the melt and change an impregnation angle of the fibers in different positions of the mold and tension of the fibers, thereby achieving the purpose of adjusting and optimizing the entire impregnation process and improving the adaptability of the second impregnation mold head B300 to different resin matrixes and fibers.

The first module B3, the intermediate module B6, and the second module B7 are placed into a mold frame, and closely contact with each other by a binding effect of the mold frame, thereby ensuring the sealing property of the formed combined flow channel B4.

As shown in FIG. 5, an embodiment with two intermediate modules B6 is shown. In the embodiment shown in FIG. 5, a downstream end of the first module flow channel B31 is connected to an upstream end of one of intermediate module flow channels B61, and two intermediate module flow channel B61 are connected to each other, a downstream end of the other one of the intermediate module flow channels B61 is connected to an upstream end of the second module flow channel B71, thereby forming a combined flow channel B4 extending from the fiber inlet B1 to the fiber outlet B8.

It is understood that, different combined flow channels B4 may be obtained by selecting different intermediate modules B6.

As shown in FIG. 5, the downstream end of the first module flow channel B31, the upstream end of the second module flow channel B71, and both ends of the intermediate module flow channel B61 are all located in the same plane, and are configured with a standardized joint B5. In other words, the first module flow channel B31, the intermediate module flow channel B61, and the second module flow channel B71 are connected by the standardized joint B5 at a connection point therebetween. Since standardized joints B5 are all located in the same plane and have the same shape and size, it is convenient for a combined connection between different modules.

Figure 6:
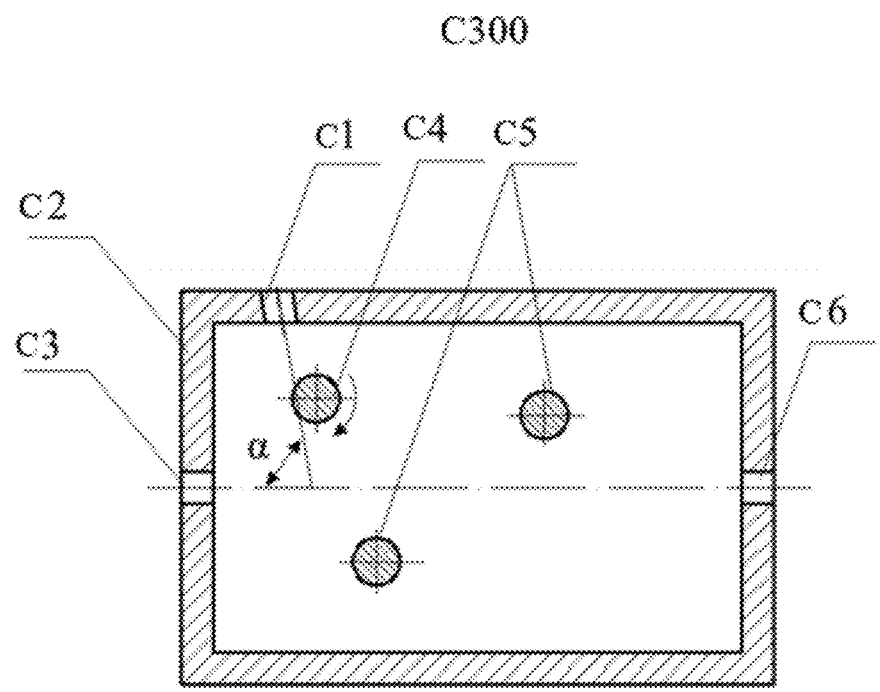
FIG. 6 is a sectional-view of a third impregnation mold according to an embodiment of the present invention.

As shown in FIG. 6, in another embodiment of the invention, the third impregnation mold is an intensely turbulent impregnation mold, and includes a third impregnation mold head C300. The third impregnation mold head C300 includes an impregnation mold outer body C2, and a fiber inlet channel C3, an impregnation outlet C6, and a melt gap flow channel C1 are provided in the impregnation mold outer body C2. The fiber inlet channel C3, the impregnation outlet C6, and the melt gap flow channel C1 are all in communication with a mold cavity in the impregnation mold outer body C2.

A second filament guiding roller is provided in the mold cavity of the impregnation mold outer body C2, and the second filament guiding roller includes at least one actuating filament guiding roller C4, and the actuating filament guiding roller C4 is actuated to rotate by an actuating device (not shown in the drawings). Since rotation of the actuating filament guiding roller C4 is actuated by the actuating device, rather than by traction of the fibers, when the fibers pass by the actuating filament guiding roller C4, the actively rotating actuating filament guiding roller C4 helps to reduce a tractive tension of the fibers and a frictional force between the fibers and the actuating filament guiding roller C4, thereby reducing an amount of fiber breakage, ensuring the integrality of the fibers, and avoiding a circumstance of the fibers is broken by pulling, and thus the mechanical property of the material is improved. Preferably, the second filament guiding roller further includes at least one actuated filament guiding roller C5, and the actuated filament guiding roller C5 is actuated by fibers which pass by the actuating filament guiding roller C4; or the actuated filament guiding roller C5 and the actuating filament guiding roller C4 are connected by a belt mechanism, a gear mechanism, or a chain mechanism. As shown in FIG. 6, an example that one actuating filament guiding roller C4 and two actuated filament guiding roller C5 are included is shown. One of the two actuated filament guiding roller C5 is provided at an upper position, and the other one of the two actuated filament guiding roller C5 is provided at a lower position, so as to lengthen an impregnation path by which the fibers pass. The actuating filament guiding roller C4 and the actuated filament guiding roller C5 may have a same height in the mold cavity or may have different heights in the mold cavity.

Further, the actuating device may be an electric motor, a hydraulic mechanism, or a reduction gearbox, etc that can actuate the actuating filament guiding roller C4 to rotate.

A corresponding tangential velocity v2 of the actuating filament guiding roller C4 may be selected based on a traveling speed v1 of the fibers which are fed into the mold cavity of the impregnation mold outer body C2. For example, the tangential velocity v2 of the actuating filament guiding roller C4 may be selected to be the same as the traveling speed v1 of the fibers, i.e., v1=v2, so as to achieve the purpose of reducing breakage and abrasion of the fibers, thereby ensuring the integrality of the fibers as well as facilitating the impregnation degree of the fibers, shortening the impregnation time length, and improving the production efficiency.

As shown in FIG. 2, the melting and plasticizing feeding device 4 is formed by one double-screw extruder, and is configured for melting and plasticizing materials. The double-screw extruder is a co-rotating double-screw extruder, and has a screw diameter of 25 mm-95 mm and a length to diameter ratio of 36:1-65:1. When the melting and plasticizing feeding device 4 is formed by one extruder 4, the melt that is melt and plasticized in the extruder is separated by a melt distributor, and the melt is fed into the impregnation mold and the forming mold respectively, respective flows are controlled by a melt flow control valve.

As shown in FIG. 3, when the melting and plasticizing feeding device 4 is formed by two extruders 4-1 and 4-2, the melt that is melt and plasticized in the extruder 4-1 and the melt that is melt and plasticized in the extruder 4-2 are respectively fed into the impregnation mold and the forming mold. In the present embodiment, the melting and plasticizing feeding device is formed by two extruders, i.e., extruder I 4-1 and extruder II 4-2, and the melt that is melt and plasticized in the extruder I 4-1 and the melt that is melt and plasticized in the extruder II 4-2 are respectively fed into the first impregnation mold 3 and the forming mold 5. The same material or different materials may be added into the extruder I 4-1 and extruder II 4-2, so that a composite material whose inner layer and outer layer are formed by the same material or different materials can be prepared.

The fiber pre-processing device 2 is formed by combining a tension roller and a hot drying channel. This combination manner enables the tension received by fibers when being fed into the hot drying channel is released to some degree, and thus is suitable for fibers of different strengths and can avoid breakage of fibers having a low strength before being fed into the impregnation mold head. A surface of the tension roller in the fiber pre-processing device 2 needs a ceramic plating processing on the surface, so as to improve the surface roughness and reduce friction to the fibers.

In the manufacturing system, the fiber frame and fiber guiding device 1 is configured for guiding the fibers out and untwisting the fibers. The device is provided with an automatically controlled untwisting device, which is linked with the tractor 8, and is electrically connected to an electronic control system (for example, a PLC control device).

In the manufacturing system, the cooling sink 6, the dry machine 7, the tractor 8, the pelletizer 9, and the collecting box 10 are all conventional apparatuses or devices known to those skilled in the art, and details are not provided here.

Figure 7:
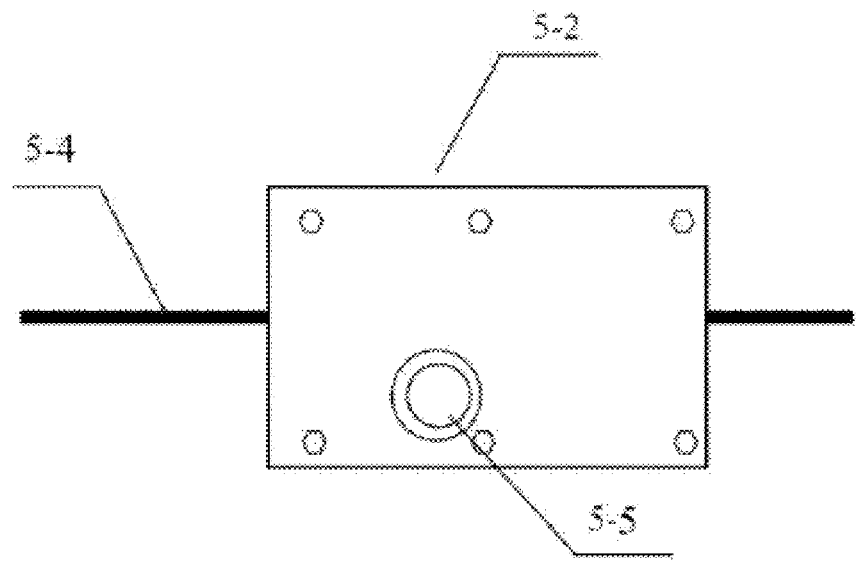
FIG. 7 is a schematic diagram of a second impregnation processing according to an embodiment of the present invention.

FIG. 7 shows a schematic diagram of performing a second impregnation processing by using the forming mold, and FIG. 8 shows a sectional-view of the forming mold used in the second impregnation processing.

As shown in FIG. 8, in an embodiment, the forming mold 5 is formed by a core portion 5-1, an outer casing 5-2, and an outer casing opening mold plate 5-3. The core portion 5-1 is located inside the outer casing 5-2, and forms a forming cavity with the outer casing 5-2. A resin melt may be fed into the forming cavity from a bottom, a top, or two sides of the outer casing 5-2. The core portion 5-1 is movable lengthways in the outer casing 5-2, and a pressure of the melt in the forming cavity is determined by adjusting a size of a space of the formed forming cavity. The pressure of the melt in the forming cavity may also be adjusted according to an intersection angle between the core portion 5-1 and the outer casing 5-2. A working principle of the forming mold 5 is as follows: a material strip which forms an inner layer impregnation material after passing through the impregnation mold 3 is guided through an aperture in a central part of the core portion 5-1; then forming of a composite structure by an inner layer material and an outer layer material is performed in a forming cavity formed by the core portion 5-1 and the outer casing 5-2 and filled with a mixed melt; and finally the formed composite structure is guided out through the outer casing opening mold plate 5-3.

As shown in FIG. 7, a material strip 5-4 is fed into the forming cavity formed by the core portion (not shown) and the outer casing 5-2 and filled with a second component melt for processing, and the second component melt is fed into the forming cavity through the second resin inlet 5-5.

In the following examples and comparative examples, the manufacturing system shown in FIG. 3 is used to prepare the thermoplastic composite material. The first impregnation mold shown in FIG. 4 is selected and used in the first impregnation processing, and the forming mold shown in FIG. 8 is used in the second impregnation processing.

Example 1

(1) 50 parts by weight of a PPB-M100-GH polypropylene resin (having a melt flow rate of 100 g/10 min), 3 parts by weight of BONDYRAM 1001, 0.1 parts by weight of antioxidant 1010, and 0.5 parts by weight of XH-201, which were dry, were weighed and mixed in a high-speed mixer at 50° C. for 3 min to obtain a first component melt, which was fed into the first impregnation mold.

(2) 30 parts by weight of glass fiber SE4805 was fed into the first impregnation mold under the action of the tractor, and was impregnated and dispersed together with the first component melt to form a material strip which was used as the inner layer material.

(3) 49 parts by weight of a PPH-Y450 polypropylene resin (having a melt flow rate of 450 g/10 min), 3 parts by weight of BONDYRAM 1001, 0.1 parts by weight of antioxidant 1010, and parts by weight of XH-201, which were dry, were weighed and mixed in a high-speed mixer at 50° C. for 3 min, and a resulting mixture was used as the outer layer material and fed into the double-screw extruder connected to the forming mold to obtain a second component melt.

(4) The inner layer material was fed into the forming mold under the action of the tractor and was guided through the aperture in the central part of the core portion to realize forming of the composite structure by the inner layer material and the outer layer material in the forming cavity formed by the core portion and the outer casing and filled with the second component melt, and finally the composite structure was guided out through an outlet of the mold.

(5) A wrapping amount of the outer layer material was adjusted by adjusting an extruding amount of the extruder for the outer layer material and adjusting a diameter of the outlet of the mold, so that wrapping was performed according to the amount defined in step (3), and a rotation speed of a cutting blade of the pelletizer was adjusted, so as to control a cutting length of the thermoplastic composite material prepared to be 6.1 mm.

(6) The polypropylene composite material prepared by using the above method was subjected to injection molding to obtain standard sample strips, and performance tests were carried out. Test results are shown in Table 1.

Example 2

(1) 20 parts by weight of home-made high-flow polypropylene (having a melt flow rate of 1000 g/10 min), 0.6 parts by weight of BONDYRAM 1001, 0.1 parts by weight of antioxidant 1010, and 0.5 parts by weight of XH-201, which were dry, were weighed and mixed in a high-speed mixer at 50° C. for 3 min to obtain a first component melt, which was fed into the first impregnation mold.

(2) 50 parts by weight of glass fiber SE4805 was fed into the first impregnation mold under the action of the tractor, and was impregnated and dispersed together with the melt to form a material strip which was used as the inner layer material.

(3) 59 parts by weight of a PPH-T03 polypropylene resin (having a melt flow rate of 3 g/10 min), 3 parts by weight of BONDYRAM 1001, 0.1 parts by weight of antioxidant 1010, and 0.5 parts by weight of XH-201, which were dry, were weighed and mixed in a high-speed mixer at ° C. for 3 min, and a resulting mixture was used as the outer layer material and fed into the double-screw extruder connected to the forming mold to obtain a second component melt.

(4) The inner layer material was fed into the forming mold under the action of the tractor and was guided through the aperture in the central part of the core portion to realize forming of the composite structure by the inner layer material and the outer layer material in the forming cavity formed by the core portion and the outer casing and filled with the second component melt, and finally the composite structure was guided out through an outlet of the mold.

(5) A wrapping amount of the outer layer material was adjusted by adjusting an extruding amount of the extruder for the outer layer material and adjusting a diameter of the outlet of the mold, so that wrapping was performed according to the amount defined in step (3), and a rotation speed of a cutting blade of the pelletizer was adjusted, so as to control a cutting length of the thermoplastic composite material prepared to be 15 mm.

(6) The polypropylene composite material prepared by using the above method was subjected to injection molding to obtain standard sample strips, and performance tests were carried out. Test results are shown in Table 1.

Example 3

(1) 20 parts by weight of home-made high-flow polypropylene (having a melt flow rate of 7500 g/10 min), 0.6 parts by weight of BONDYRAM 1001, 0.1 parts by weight of antioxidant 1010, and 0.5 parts by weight of XH-201, which were dry, were weighed and mixed in a high-speed mixer at 50° C. for 3 min to obtain a first component melt, which was fed into the first impregnation mold.

(2) 80 parts by weight of glass fiber SE4805 was fed into the first impregnation mold under the action of the tractor, and was impregnated and dispersed together with the melt to form a material strip which was used as the inner layer material.

(3) 69 parts by weight of a K8303 polypropylene resin (having a melt flow rate of 1.5 g/10 min), 3 parts by weight of BONDYRAM 1001, 0.1 parts by weight of antioxidant 1010, and 0.5 parts by weight of XH-201, which were dry, were weighed and mixed in a high-speed mixer at 50° C. for 3 min, and a resulting mixture was used as the outer layer material and fed into the double-screw extruder connected to the forming mold to obtain a second component melt.

(4) The inner layer material was fed into the forming mold under the action of the tractor and was guided through the aperture in the central part of the core portion to realize forming of the composite structure by the inner layer material and the outer layer material in the forming cavity formed by the core portion and the outer casing and filled with the second component melt, and finally the composite structure was guided out through an outlet of the mold.

(5) A wrapping amount of the outer layer material was adjusted by adjusting an extruding amount of the extruder for the outer layer material and adjusting a diameter of the outlet of the mold, so that wrapping was performed according to the amount defined in step (3), and a rotation speed of a cutting blade of the pelletizer was adjusted, so as to control a cutting length of the thermoplastic composite material prepared to be 18 mm.

(6) The polypropylene composite material prepared by using the above method was subjected to injection molding to obtain standard sample strips, and performance tests were carried out. Test results are shown in Table 1.

Example 4

(1) 70 parts by weight of PPB-M100-GH (having a melt flow rate of 100 g/10 min), 3 parts by weight of BONDYRAM 1001, 0.1 parts by weight of antioxidant 1010, and 0.5 parts by weight of XH-201, which were dry, were weighed and mixed in a high-speed mixer at 50° C. for 3 min to obtain a first component melt, which was fed into the first impregnation mold.

(2) 25 parts by weight of glass fiber SE4805 was fed into the first impregnation mold under the action of the tractor, and was impregnated and dispersed together with the melt to form a material strip which was used as the inner layer material.

(3) 10 parts by weight of home-made high-flow polypropylene (having a melt flow rate of 1900 g/10 min), 0.5 parts by weight of BONDYRAM 1001, 0.05 parts by weight of antioxidant 1010, and 0.25 parts by weight of XH-201, which were dry, were weighed and mixed in a high-speed mixer at 50° C. for 3 min, and a resulting mixture was used as the outer layer material and fed into the double-screw extruder connected to the forming mold to obtain a second component melt.

(4) The inner layer material was fed into the forming mold under the action of the tractor and was guided through the aperture in the central part of the core portion to realize forming of the composite structure by the inner layer material and the outer layer material in the forming cavity formed by the core portion and the outer casing and filled with the second component melt, and finally the composite structure was guided out through an outlet of the mold.

(5) A wrapping amount of the outer layer material was adjusted by adjusting an extruding amount of the extruder for the outer layer material and adjusting a diameter of the outlet of the mold, so that wrapping was performed according to the amount defined in step (3), and a rotation speed of a cutting blade of the pelletizer was adjusted, so as to control a cutting length of the thermoplastic composite material prepared to be 5 mm.

(6) The polypropylene composite material prepared by using the above method was subjected to injection molding to obtain standard sample strips, and performance tests were carried out. Test results are shown in Table 1.

Example 5

(1) 57 parts by weight of M60RHC (having a melt flow rate of 60 g/10 min), 2.5 parts by weight of BONDYRAM 1001, 0.5 parts by weight of NDZ12, 0.1 parts by weight of antioxidant 168, and 0.25 parts by weight of XH-201, which were dry, were weighed and mixed in a high-speed mixer at 50° C. for 3 min to obtain a first component melt, which was fed into the first impregnation mold.

(2) 40 parts by weight of glass fiber SE4805 was fed into the first impregnation mold under the action of the tractor, and was impregnated and dispersed together with the melt to form a material strip which was used as the inner layer material.

(3) 97 parts by weight of a M50RH polypropylene resin (having a melt flow rate of 50 g/10 min), 4 parts by weight of BONDYRAM 1001, 0.8 parts by weight of NDZ12, 0.1 parts by weight of antioxidant 168, and 0.8 parts by weight of XH-201, which were dry, were weighed and mixed in a high-speed mixer at 50° C. for 3 min, and a resulting mixture was used as the outer layer material and fed into the double-screw extruder connected to the forming mold to obtain a second component melt.

(4) The inner layer material was fed into the forming mold under the action of the tractor and was guided through the aperture in the central part of the core portion to realize forming of the composite structure by the inner layer material and the outer layer material in the forming cavity formed by the core portion and the outer casing and filled with the second component melt, and finally the composite structure was guided out through an outlet of the mold.

(5) A wrapping amount of the outer layer material was adjusted by adjusting an extruding amount of the extruder for the outer layer material and adjusting a diameter of the outlet of the mold, so that wrapping was performed according to the amount defined in step (3), and a rotation speed of a cutting blade of the pelletizer was adjusted, so as to control a cutting length of the thermoplastic composite material prepared to be 10 mm.

(6) The polypropylene composite material prepared by using the above method was subjected to injection molding to obtain standard sample strips, and performance tests were carried out. Test results are shown in Table 1.

Example 6

(1) 57 parts by weight of PA6-BL3200H, 3 parts by weight of CMG9805, 0.1 parts by weight of antioxidant 1010, and 0.5 parts by weight of XH-201, which were dry, were weighed and mixed in a high-speed mixer at 50° C. for 3 min to obtain a first component melt, which was fed into the first impregnation mold.

(2) ER4301H was fed into the first impregnation mold under the action of the tractor, and was impregnated and dispersed together with the first component melt to form a material strip which was used as the inner layer material.

(3) 97 parts by weight of PA6-BL3200H, 3 parts by weight of CMG9805, 0.1 parts by weight of antioxidant 1010, and 0.5 parts by weight of XH-201, which were dry, were weighed and mixed in a high-speed mixer at 50° C. for 3 min, and a resulting mixture was used as the outer layer material and fed into the double-screw extruder connected to the forming mold to obtain a second component melt.

(4) The inner layer material was fed into the forming mold under the action of the tractor and was guided through the aperture in the central part of the core portion to realize forming of the composite structure by the inner layer material and the outer layer material in the forming cavity formed by the core portion and the outer casing and filled with the second component melt, and finally the composite structure was guided out through an outlet of the mold.

(5) A wrapping amount of the outer layer material was adjusted by adjusting an extruding amount of the extruder for the outer layer material and adjusting a diameter of the outlet of the mold, so that wrapping was performed according to the amount defined in step (3), and a rotation speed of a cutting blade of the pelletizer was adjusted, so as to control a cutting length of the thermoplastic composite material prepared to be 12 mm. In the composite material, ER4301H accounts for 40 wt %.

(6) A long glass fiber enhanced PA6 composite material prepared by using the above method was subjected to injection molding to obtain standard sample strips, and performance tests were carried out. Test results are shown in Table 1.

Example 7

(1) 57 parts by weight of PPB-M100-GH, 3 parts by weight of BONDYRAM 1001, 0.5 parts by weight of XHY-501, 0.1 parts by weight of antioxidant 1010, and 0.5 parts by weight of XH-201, which were dry, were weighed and mixed in a high-speed mixer at 50° C. for 3 min to obtain a first component melt, which was fed into the first impregnation mold.

(2) A continuous basalt fiber was fed into the first impregnation mold under the action of the tractor, and was impregnated and dispersed together with the first component melt to form a material strip which was used as the inner layer material.

(3) 97 parts by weight of PPB-M100-GH, 3 parts by weight of BONDYRAM 1001, 0.5 parts by weight of XHY-501, 0.1 parts by weight of antioxidant 1010, and 0.5 parts by weight of XH-201, which were dry, were weighed and mixed in a high-speed mixer at 50° C. for 3 min, and a resulting mixture was used as the outer layer material and fed into the double-screw extruder connected to the forming mold to obtain a second component melt.

(4) The inner layer material was fed into the forming mold under the action of the tractor and was guided through the aperture in the central part of the core portion to realize forming of the composite structure by the inner layer material and the outer layer material in the forming cavity formed by the core portion and the outer casing and filled with the second component melt, and finally the composite structure was guided out through an outlet of the mold.

(5) A wrapping amount of the outer layer material was adjusted by adjusting an extruding amount of the extruder for the outer layer material and adjusting a diameter of the outlet of the mold, so that wrapping was performed according to the amount defined in step (3), and a rotation speed of a cutting blade of the pelletizer was adjusted, so as to control a cutting length of the thermoplastic composite material prepared to be 12 mm. In the composite material, the continuous basalt fiber accounts for 40 wt %.

(6) A basalt fiber enhanced PP composite material prepared by using the above method was subjected to injection molding to obtain standard sample strips, and performance tests were carried out. Test results are shown in Table 1.

Example 8

(1) 57 parts by weight of PA6-BL3200H, 3 parts by weight of BONDYRAM 1001, 0.5 parts by weight of NDZ12, 0.1 parts by weight of antioxidant 1010, and 0.5 parts by weight of XH-201, which were dry, were weighed and mixed in a high-speed mixer at 50° C. for 3 min to obtain a first component melt, which was fed into the first impregnation mold.

(2) A continuous carbon fiber was fed into the first impregnation mold under the action of the tractor, and was impregnated and dispersed together with the first component melt to form a material strip which was used as the inner layer material.

(3) 97 parts by weight of PA6-BL3200H, 3 parts by weight of BONDYRAM 1001, 0.5 parts by weight of NDZ12, 0.1 parts by weight of antioxidant 1010, and 0.5 parts by weight of XH-201, which were dry, were weighed and mixed in a high-speed mixer at 50° C. for 3 min, and a resulting mixture was used as the outer layer material and fed into the double-screw extruder connected to the forming mold to obtain a second component melt.

(4) The inner layer material was fed into the forming mold under the action of the tractor and was guided through the aperture in the central part of the core portion to realize forming of the composite structure by the inner layer material and the outer layer material in the forming cavity formed by the core portion and the outer casing and filled with the second component melt, and finally the composite structure was guided out through an outlet of the mold.

(5) A wrapping amount of the outer layer material was adjusted by adjusting an extruding amount of the extruder for the outer layer material and adjusting a diameter of the outlet of the mold, so that wrapping was performed according to the amount defined in step (3), and a rotation speed of a cutting blade of the pelletizer was adjusted, so as to control a cutting length of the thermoplastic composite material prepared to be 12 mm. In the composite material, the continuous carbon fiber accounts for 40 wt %.

(6) A long carbon fiber enhanced PA6 composite material prepared by using the above method was subjected to injection molding to obtain standard sample strips, and performance tests were carried out. Test results are shown in Table 1.

Example 9

The preparation process is the same as the process in Example 1 except that, 70 parts by weight of PPB-M100-GH was weighed in step (1) and 85 parts by weight of PPH-Y450 was weighed in step (3). Performance tests were carried out on the composite material prepared, and test results are shown in Table 1.

Example 10

The preparation process is the same as the process in Example 1 except that, 45 parts by weight of PPB-M100-GH was weighed in step (1) and 65 parts by weight of PPH-Y450 was weighed in step (3). Performance tests were carried out on the composite material prepared, and test results are shown in Table 1.

Example 11

The preparation process is the same as the process in Example 1 except that, 25 parts by weight of PPB-M100-GH was weighed in step (1) and 45 parts by weight of PPH-Y450 was weighed in step (3). Performance tests were carried out on the composite material prepared, and test results are shown in Table 1.

Example 12

The preparation process is the same as the process in Example 1 except that, 55 parts by weight of PPB-M100-GH was weighed in step (1) and 70 parts by weight of PPH-Y450 was weighed in step (3). Performance tests were carried out on the composite material prepared, and test results are shown in Table 1.

Example 13

(1) 50 parts by weight of PPB-M100-GH polypropylene resin (having a melt flow rate of 100 g/10 min), 3 parts by weight of BONDYRAM 1001, 0.1 parts by weight of antioxidant 1010, and 0.5 parts by weight of XH-201, which were dry, were weighed and mixed in a high-speed mixer at 50° C. for 3 min to obtain a first component melt, which was fed into the first impregnation mold.

(2) 30 parts by weight of glass fiber SE4805 was fed into the first impregnation mold under the action of the tractor, and was impregnated and dispersed together with the first component melt to form a material strip which was used as the inner layer material.

(3) 49 parts by weight of M60RHC polypropylene resin (having a melt flow rate of 60 g/10 min), 20 parts by weight of short glass fiber having a length of 3 mm cut from the glass fiber SE4805, 2.5 parts by weight of BONDYRAM 1001, 0.1 parts by weight of antioxidant 1010, and 0.5 parts by weight of XH-201, which were dry, were weighed and mixed in a high-speed mixer at 50° C. for 3 min, and a resulting mixture was used as the outer layer material and fed into the double-screw extruder connected to the forming mold to obtain a second component melt.

(4) The inner layer material was fed into the forming mold under the action of the tractor and was guided through the aperture in the central part of the core portion to realize forming of the composite structure by the inner layer material and the outer layer material in the forming cavity formed by the core portion and the outer casing and filled with the second component melt, and finally the composite structure was guided out through an outlet of the mold.

(5) A wrapping amount of the outer layer material was adjusted by adjusting an extruding amount of the extruder for the outer layer material and adjusting a diameter of the outlet of the mold, so that wrapping was performed according to the amount defined in step (3), and a rotation speed of a cutting blade of the pelletizer was adjusted, so as to control a cutting length of the thermoplastic composite material prepared to be 6.1 mm.

(6) The polypropylene composite material prepared by using the above method was subjected to injection molding to obtain standard sample strips, and performance tests were carried out. Test results are shown in Table 1.

Example 14

The preparation process is the same as the process in Example 1 except that, 5 parts by weight of polypropylene-g-glycidyl methacrylate was added in step (1) and in step (3) respectively. Test results are shown in Table 1.

Example 15

The preparation process is the same as the process in Example 1 except that, 5 parts by weight of polypropylene-g-styrene was added in step (1) and in step (3) respectively. Test results are shown in Table 1.

Example 16

The preparation process is the same as the process in Example 1 except that, 5 parts by weight of polypropylene-g-vinyltriethoxysilane was added in step (1) and in step (3) respectively. Test results are shown in Table 1.

Example 17

The preparation process is the same as the process in Example 1 except that, 5 parts by weight of polypropylene-g-styrene/maleic anhydride was added in step (1) and in step (3) respectively. Test results are shown in Table 1.

Example 18

The preparation process is the same as the process in Example 1 except that, 5 parts by weight of polypropylene-g-vinyl imidazole was added in step (1) and in step (3) respectively. Test results are shown in Table 1.

Comparative Example 1

(1) 57 parts by weight of PPB-M100-GH, 3 parts by weight of BONDYRAM 1001, 0.1 parts by weight of antioxidant 1010, and 0.5 parts by weight of XH-201, which were dry, were weighed and mixed in a high-speed mixer at 50° C. for 3 min to obtain a melt, which was fed into an impregnation mold.

(2) SE4805 was fed into the impregnation mold under the action of the tractor and was impregnated and dispersed together with the melt, and a content of SE4805 in a composite material was adjusted to be 22 wt % by selecting a size of a shaped mouth template of the impregnation mold, a rotation speed of a cutting blade of the pelletizer is adjusted, so as to control a cutting length of the polypropylene composite material prepared to be 12 mm.

(3) The polypropylene composite material prepared by using the above method was subjected to injection molding to obtain standard sample strips, and performance tests were carried out. Test results are shown in Table 1.

Comparative Example 2

(1) 50 parts by weight of PPB-M100-GH polypropylene resin (having a melt flow rate of 100 g/10 min), 30 parts by weight of short glass fiber having a length of 3 mm cut from glass fiber SE4805, 3 parts by weight of BONDYRAM 1001, 0.1 parts by weight of antioxidant 1010, and 0.5 parts by weight of XH-201, which were dry, were weighed and mixed in a high-speed mixer at 50° C. for 3 min, and a resulting mixture was used as an inner layer resin.

(2) 49 parts by weight of M60RHC polypropylene resin (having a melt flow rate of 60 g/10 min), 20 parts by weight of short glass fiber having a length of 3 mm cut from the glass fiber SE4805, 3 parts by weight of BONDYRAM 1001, 0.1 parts by weight of antioxidant 1010, and 0.5 parts by weight of XH-201, which were dry, were weighed and mixed in a high-speed mixer at 50° C. for 3 min, and a resulting mixture was used as an outer layer resin.

(3) The inner layer resin was added to extruder No. 1, and the outer layer resin was added to extruder No. 2. Raw materials were extruded from two extruders at the same time, and a continuous filament material with an inner layer formed by a short glass fiber-containing resin layer and an outer layer formed by a short glass fiber-containing resin layer was extruded from a mold head having a structure formed by an inner layer and an outer layer, raw materials of this comparative example are obtained after particle cutting was performed. Test results are shown in Table 1.

TABLE 1

|  | Tensile strength (MPa) | Bending strength (MPa) | Bending modulus (GPa) | Charpy notch impact (KJ/m$^2$) | Surface glossiness/ 60°(GU) | Volume resistivity (Ω · m) |
|---|---|---|---|---|---|---|
| D1 | 107 | 135 | 4.7 | 14.8 | 20.3 | 1.9 × 10$^{16}$ |
| D2 | 110 | 134 | 6.2 | 15.2 | 20.1 | 2.1 × 10$^{16}$ |
| S1 | 132 | 145 | 5.4 | 17.6 | 38.9 | — |
| S2 | 153 | 187 | 7.9 | 28.9 | 32.0 | — |
| S3 | 160 | 211 | 9.4 | 35.7 | 32.2 | — |
| S4 | 130 | 143 | 5.1 | 17.0 | 39.4 | — |
| S5 | 121 | 140 | 5.1 | 18.1 | 33.5 | — |
| S6 | 211 | 290 | 9.5 | 34.6 | — | — |
| S7 | 116 | 134 | 8.7 | 53.1 | — | — |
| S8 | 247 | 344 | 24 | 80.3 | — | — |
| S9 | 119 | 138 | 5.0 | 17.2 | 39.2 | — |
| S10 | 131 | 144 | 5.5 | 17.3 | 39.1 | — |
| S11 | 142 | 172 | 6.7 | 23.4 | 38.8 | — |
| S12 | 128 | 141 | 5.2 | 17.9 | 39.4 | — |
| S13 | 147 | 188 | 8.0 | 31.2 | 31.4 | — |

TABLE 1-continued

|  | Tensile strength (MPa) | Bending strength (MPa) | Bending modulus (GPa) | Charpy notch impact (KJ/m$^2$) | Surface glossiness/ 60°(GU) | Volume resistivity (Ω · m) |
|---|---|---|---|---|---|---|
| S14 | 130 | 141 | 5.4 | 17.8 | 36.5 | 4.4 × 10$^{16}$ |
| S15 | 129 | 142 | 5.8 | 17.8 | 36.2 | 5.4 × 10$^{16}$ |
| S16 | 131 | 145 | 5.6 | 18.0 | 37.2 | 3.7 × 10$^{16}$ |
| S17 | 132 | 140 | 5.7 | 18.0 | 37.7 | 4.3 × 10$^{16}$ |
| S18 | 128 | 144 | 5.5 | 17.7 | 37.0 | 4.9 × 10$^{16}$ |

Note:
D1 and D2 in Table 1 respectively indicate Comparative Example 1 and Comparative Example 2, and S1 to S18 respectively indicate Example 1 to Example 18.

By comparing Examples 1-5 and 9-19 with Comparative Examples 1-2, it can be seen that the long glass fiber enhanced polypropylene material prepared in the present invention has a tensile strength, a bending strength, a Charpy notch impact strength, and a surface glossiness that are clearly higher than those of the material prepared in Comparative Example 1, and a manufactured work piece has a higher surface quality.

According to Examples 6-8 of the present invention, it can be seen that the preparation method put forward in the present invention is not only suitable for the preparation of a long glass fiber enhanced polypropylene composite material but also suitable for the preparation of a continuous glass fiber enhanced PA6 composite material, a continuous basalt fiber enhanced polypropylene composite material, and a continuous carbon fiber enhanced PA6 composite material.

Further, it can be seen from data in Table 1 that, the prepared composite material may have an ideal surface glossiness by selecting a melt flow rate of the thermoplastic resin of the inner layer material and a melt flow rate of the thermoplastic resin of the outer layer material.

The preparation method in the present invention is easy to operate, can realize continuous production on the production line, can ensure a relatively high production capacity and relatively low energy consumption, and thus is suitable for industrial production and application.

The above description only involves preferred examples of the present invention. It should be noted that, for those of ordinary skills in the art, based on technical inspirations provided by the present invention and common knowledge in the art, other equivalent changes and improvements may also be made, which also fall into the protection scope of the present invention.

The invention claimed is:

1. A thermoplastic composite material, comprising an inner core embedded in at least one layer of outer layer material, wherein:
   the inner core comprises a plurality of fiber bundles distributed in a mixture of a first thermoplastic resin and a first auxiliary agent,
   the at least one layer of outer layer material is a resin layer comprising a second thermoplastic resin and an optional second auxiliary agent,
   the plurality of fiber bundles extend continuously from a first end of the inner core to a second end thereof,
   the first thermoplastic resin and the second thermoplastic resin are the same or different, and each is independently at least one selected from polypropylene, polyethylene, polystyrene, polyvinyl chloride, polyacrylonitrile-butadiene-styrene copolymer, polyacrylonitrile-styrene copolymer, polyformaldehyde, polyamide, polyethylene terephthalate, polybutylene terephthalate, polymethyl methacrylate, polycarbonate, polyphenyl ether, polyurethane, polyether ether ketone, polyphenylene sulfide, and alloy polymers thereof, and a melt flow rate of the first thermoplastic resin under conditions of 230° C. and 2.16 kg load is 60-8000 g/10 min, a melt flow rate of the second thermoplastic resin under conditions of 230° C. and 2.16 kg load is 0.1-8000 g/10 min, and the melt flow rate of the first thermoplastic resin at 230° C. and under a 2.16 kg load differs from the melt flow rate of the second thermoplastic resin at 230° C. and under a 2.16 kg load.

2. The thermoplastic composite material according to claim 1, wherein the thermoplastic composite material in the shape of strips, rods, or granules, and the length of the thermoplastic composite material in the shape of strips, rods, or granules is 5-30 mm.

3. The thermoplastic composite material according to claim 1, wherein in the inner core, an amount of the first thermoplastic resin is 1-90 parts by weight; and an amount of the plurality of fiber bundles is 10-110 parts by weight; and/or in the inner core, a weight ratio of the plurality of fiber bundles to the first thermoplastic resin is 0.25-6:1; and/or in the outer layer material, an amount of the second thermoplastic resin is 1-110 parts by weight.

4. The thermoplastic composite material according to claim 1, wherein the inner core does not contain non-orientated short fibers, or the outer layer material does not contain fiber.

5. The thermoplastic composite material according to claim 1, wherein the outer layer material contains short fibers.

6. The thermoplastic composite material according to claim 1, wherein the plurality of fiber bundles comprises at least one fiber selected from glass fiber, carbon fiber, basalt fiber, aromatic polyamide fiber, stainless steel fiber, synthetic resin fiber, and mineral fiber.

7. The thermoplastic composite material according to claim 1, wherein when the melt flow rate of the second thermoplastic resin under conditions of 230° C. and 2.16 kg load is 800-8000 g/10 min, the weight ratio of the second thermoplastic resin to the first thermoplastic resin is less than 0.25:1; and/or when the first thermoplastic resin and the second thermoplastic resin are selected from nylon 6, nylon 66, and a mixture of nylon 6 and nylon 66, a viscosity of the nylon 6 and nylon 66 is 1.8-3.5.

8. The thermoplastic composite material according to claim 1, wherein on a basis that the first thermoplastic resin has a mass of 100 parts by weight, the first auxiliary agent comprises 0.5-15 parts by weight of a compatilizer, 0.05-3 parts by weight of an antioxidant, and 0.05-2.5 parts by weight of a lubricant;

on a basis that the second thermoplastic resin has a mass of 100 parts by weight, the second auxiliary agent independently comprises 0.5-15 parts by weight of a compatilizer, 0.05-3 parts by weight of an antioxidant, and 0.05-2.5 parts by weight of a lubricant; and/or the compatilizer is at least one selected from graft modified polymers of polar monomers; and/or the antioxidant is at least one selected from tetra [β-(3, 5-di-tert-butyl-4-hydroxyphenyl) propionic acid] pentaerythritol ester, tri [2,4-di-tert-butylphenyl] phosphite ester, octadecyl β-(3,5-di-tert-butyl-4-hydroxyphenyl) propionate, 2,2'-methylene bis (4-methyl-6-tert-butylphenol), 1,1,3-tri (2-methyl-4-hydroxyl-5-tert-butylphenyl) butane, and bis (2,4-di-tert-butylphenol) pentaerythritol diphosphite; and/or the lubricant is at least one selected from ethylene bis stearamide, calcium stearate, polyethylene wax, pentaerythritol stearate, silicone, polyethylene glycol, and fluorine-containing resin; and/or the first auxiliary agent comprises at least one selected from slip agent, antistatic agent, and plasticizer; and/or the second auxiliary agent comprises at least one selected from slip agent, antistatic agent, plasticizer, nucleating agent, light stabilizer, flame retardant, heat stabilizer, color master, and filler.

9. The thermoplastic composite material according to claim 8, wherein the first auxiliary agent and the second auxiliary agent each independently comprises 2-30 parts by weight of an electrical insulation modifier.

10. The thermoplastic composite material according to claim 9, wherein on the basis of the first thermoplastic resin and the second thermoplastic resin having a mass of 100 parts by weight, the first auxiliary agent and the second auxiliary agent each independently comprise 5-25 parts by weight of the electrical insulation modifier;

and/or, the electrical insulation modifier is at least one of the following a) to e):

a) alkyl and/or alkoxy graft modified polypropylene, which comprises a structural unit derived from co-polypropylene and a structural unit derived from acrylate monomer and optional acrylic monomer;

b) aromatic olefin graft modified polypropylene, which comprises a structural unit derived from co-polypropylene and a structural unit derived from styrene monomer;

c) silane modified polypropylene graft, which comprises a structural unit derived from co-polypropylene and a structural unit derived from silane monomer containing alkenyl;

d) polypropylene graft containing an acid anhydride group, which comprises a structural unit derived from co-polypropylene, a structural unit derived from maleic anhydride monomer, and a structural unit derived from alkenyl-containing polymeric monomer; and/or e) polypropylene graft heterocyclic ring modified material, which comprises a structural unit derived from co-polypropylene and a structural unit derived from heterocyclic ring monomer containing alkenyl.

11. The thermoplastic composite material according to claim 8, wherein on the basis of the first thermoplastic resin and the second thermoplastic resin respectively having a mass of 100 parts by weight, the first auxiliary agent and the second auxiliary agent each independently comprise at least one of 1-15 parts by weight of the compatilizer, 0.1-1 parts by weight of the antioxidant, and 0.5-2.5 parts by weight of the lubricant; and/or the polar monomer is selected from at least one of a group consisting of maleic anhydride, maleic anhydride derivative, propenoic acid, and acrylate derivative; and/or the polymer is selected from at least one of a group consisting of polyethylene, polypropylene, ethylene-α-olefin copolymer, and propylene-α-olefin copolymer.

12. The thermoplastic composite material according to claim 1, wherein in the inner core, an amount of the first thermoplastic resin is 20-70 parts by weight; and an amount of the plurality of fiber bundles is 20-110 parts by weight; and/or in the inner core, a weight ratio of the plurality of fiber bundles to the first thermoplastic resin is 0.35-4.5:1; and/or in the outer layer material, an amount of the second thermoplastic resin is 10-99 parts by weight.

13. The thermoplastic composite material according to claim 1, wherein in the inner core, an amount of the first thermoplastic resin is 20-55 parts by weight; and an amount of the plurality of fiber bundles is 25-110 parts by weight; and/or in the inner core, a weight ratio of the plurality of fiber bundles to the first thermoplastic resin is 0.43-4.5:1; and/or in the outer layer material, an amount of the second thermoplastic resin is 40-90 parts by weight.

14. The thermoplastic composite material according to claim 1, wherein in the inner core, the amount of the first thermoplastic resin is 1-90 parts by weight; and/or the amount of the plurality of fiber bundles is 10-99 parts by weight; or in the inner core, the amount of the first thermoplastic resin is 50-70 parts by weight; and/or the amount of the plurality of fiber bundles is 90-110 parts by weight; or in the outer layer material, the amount of the second thermoplastic resin is 90-110 parts by weight; or the outer layer material contains short fibers; and in the outer layer material, a weight ratio of the fibers to the second thermoplastic resin is 1-50:100; or the outer layer material contains short fibers; and in the outer layer material, a weight ratio of the fibers to the second thermoplastic resin is 20-45:100; or the melt flow rate of the first thermoplastic resin under conditions of 230° C. and 2.16 kg load is 100-8000 g/10 min; and the melt flow rate of the second thermoplastic resin under conditions of 230° C. and 2.16 kg load is 3-55 g/10 min or 450-8000 g/10 min.

15. The thermoplastic composite material according to claim 1, the first thermoplastic resin and the second thermoplastic resin are independently at least one selected from homo-polypropylene, co-polypropylene, a mixture of homo-polypropylene and co-polypropylene, nylon 6, nylon 66, and a mixture of nylon 6 and nylon 66; or the melt flow rate of the first thermoplastic resin under conditions of 230° C. and 2.16 kg load is 1000-7500 g/10 min; and/or the melt flow rate of the second thermoplastic resin under conditions of 230° C. and 2.16 kg load is 3-45 g/10 min or 1900-8000 g/10 min.

16. The thermoplastic composite material according to claim 1, wherein the melt flow rate of the first thermoplastic resin under conditions of 230° C. and 2.16 kg load is 60-450 g/10 min, and the melt flow rate of the second thermoplastic resin under conditions of 230° C. and 2.16 kg load is 3-55 g/10 min or 450-8000 g/10 min; or the melt flow rate of the first thermoplastic resin under conditions of 230° C. and 2.16 kg load is equal to or greater than 450 g/10 min, and the melt flow rate of the second thermoplastic resin under conditions of 230° C. and 2.16 kg load is less than 100 g/10 min; or a weight ratio of the second thermoplastic resin to the first thermoplastic resin is 0.05-12.5:1.

17. The thermoplastic composite material according to claim 1, wherein the melt flow rate of the first thermoplastic resin under conditions of 230° C. and 2.16 kg load is 60-200 g/10 min, and the melt flow rate of the second thermoplastic resin under conditions of 230° C. and 2.16 kg load is 3-55 g/10 min or 450-8000 g/10 min; or the melt flow rate of the first thermoplastic resin under conditions of 230° C. and 2.16 kg load is greater than 450 g/10 min, and the melt flow rate of the second thermoplastic resin under conditions of 230° C. and 2.16 kg load is 1.5-55 g/10 min; and/or a weight ratio of the second thermoplastic resin to the first thermoplastic resin is 0.1-4:1.

18. The thermoplastic composite material according to claim 1, wherein the melt flow rate of the first thermoplastic resin under conditions of 230° C. and 2.16 kg load is 60-450 g/10 min, and the melt flow rate of the second thermoplastic resin under conditions of 230° C. and 2.16 kg load is 800-8000 g/10 min; or the melt flow rate of the first thermoplastic resin under conditions of 230° C. and 2.16 kg load is greater than 450 g/10 min, and the melt flow rate of the second thermoplastic resin under conditions of 230° C. and 2.16 kg load is 3-50 g/10 min; and/or a weight ratio of the second thermoplastic resin to the first thermoplastic resin is 0.14-3.5:1.

19. The thermoplastic composite material according to claim 1, wherein when the melt flow rate of the second thermoplastic resin under conditions of 230° C. and 2.16 kg load is 800-8000 g/10 min, the weight ratio of the second thermoplastic resin to the first thermoplastic resin is less than 0.18:1.

20. A preparation method for the thermoplastic composite material according to claim 1, comprising:

step A of obtaining a first component melt by mixing the first thermoplastic resin and the first auxiliary agent to form a first mixture and melting the first mixture;

step B of forming the inner core by subjecting continuous fiber bundles and the first component melt to a first impregnation processing;

step C of obtaining a second component melt by mixing the second thermoplastic resin and a second auxiliary agent to form a second mixture and melting the second mixture; and step D of forming a resin layer covering the inner core by subjecting the inner core and the second component melt to a second impregnation processing.

21. The preparation method according to claim 20, wherein in step A, mixing is carried out at a temperature of 40-60° C. for 0.5-20 min, and melting is carried out at 200-380° C.; and/or in step C, mixing is carried out at a temperature of 40-60° C. for 0.5-20 min, and melting is carried out at 200-380° C.

22. The preparation method according to claim 20, wherein the first impregnation processing in step B is performed in a first impregnation mold, wherein the first impregnation mold is an adjustable impregnation mold, and comprises a fiber inlet, a fiber outlet, and a melt flow channel; and the first impregnation mold is provided, in a mold cavity, with at least one first filament guiding roller, wherein the first filament guiding roller is movable between the fiber inlet and the fiber outlet, and/or the first filament guiding roller is movable in a direction perpendicular to a connecting line of the fiber inlet and the fiber outlet.

23. The preparation method according to claim 20, wherein the first impregnation processing in step B is performed in a second impregnation mold, wherein the second impregnation mold is a combined impregnation mold, and comprises a first module, an intermediate module, and a second module which are connected in series, wherein the first module is provided with a fiber inlet and a first module flow channel, and the second module is provided with a fiber outlet and a second module flow channel, the intermediate module is provided with an intermediate module flow channel; and after the first module, the intermediate module, and the second module are connected in series, the first module flow channel, the intermediate module flow channel, and the second module flow channel are in communication with each other so as to form a combined flow channel for passage of the fibers.

24. The preparation method according to claim 20, wherein the first impregnation processing in step B is performed in a third impregnation mold, wherein the third impregnation mold is an intensely turbulent impregnation mold, and comprises a fiber inlet channel, an impregnation outlet, and a melt gap flow channel, and the fiber inlet channel, the impregnation outlet, and the melt gap flow channel are all in communication with the mold cavity inside the third impregnation mold, wherein the third impregnation mold is provided, in the mold cavity, with a second filament guiding roller, and the second filament guiding roller comprises at least one actuating filament guiding roller which is actuated to rotate by an actuating device.

\* \* \* \* \*